United States Patent [19]

Ramsey et al.

[11] Patent Number: 5,213,726

[45] Date of Patent: May 25, 1993

[54] MOLDING AND GAUGING METHOD

[75] Inventors: Charles R. Ramsey, Dunkirk; Jerry M. Fine, Brazil; Russell E. Holcomb, Greencastle; Leland K. Shirely, Cloverdale, all of Ind.

[73] Assignee: Matrix Technologies, Inc., Muncie, Ind.

[21] Appl. No.: 727,329

[22] Filed: Jul. 3, 1991

Related U.S. Application Data

[63] Continuation of Ser. No. 487,954, filed as PCT/US88/03561, Oct. 13, 1988, published as WO 89/03292, Apr. 20, 1989, abandoned, which is a continuation-in-part of Ser. No. 108,484, Oct. 14, 1987, Pat. No. 4,824,351.

[51] Int. Cl.$^5$ ............................................. B29C 39/44
[52] U.S. Cl. ............................ 264/40.5; 264/328.1; 425/150; 425/171; 73/37.6; 73/37.8; 73/700; 164/4.1
[58] Field of Search .................. 264/40.5, 40.7, 328.1; 425/135, 136, 138, 149, 150, 151, 152, 153, 161, 162, 166, 167, 171, 395, 406, 408, 415, 423, 450.1, 451.2, 451.9, 589, 590; 164/4.1, 137, 150, 154, 342; 137/804; 73/700, 37.5–37.9

[56] References Cited

U.S. PATENT DOCUMENTS

| | | | |
|---|---|---|---|
| 1,985,576 | 12/1934 | Mennesson | 33/174 |
| 3,266,309 | 8/1966 | Fishman et al. | 73/205 |
| 3,277,914 | 11/1966 | Manion | 137/81.5 |
| 3,467,122 | 9/1969 | Jones | 137/81.5 |
| 3,507,212 | 4/1970 | Matteson | 100/53 |
| 3,543,779 | 12/1970 | Eckevlin et al. | 137/81.5 |
| 3,632,251 | 1/1972 | Henry | 425/166 |
| 3,677,680 | 7/1972 | Etherington | 425/129 |
| 3,754,433 | 8/1973 | Hyer | 73/37.6 |
| 3,863,493 | 2/1975 | Busenkell | 73/37.5 |
| 3,942,928 | 3/1976 | Kela | 425/138 |
| 4,131,596 | 12/1978 | Allen | 264/40.5 |
| 4,159,636 | 7/1979 | Jicha et al. | 73/37.6 |
| 4,473,345 | 9/1984 | McDowell | 425/137 |

(List continued on next page.)

FOREIGN PATENT DOCUMENTS 60-79772  4/1985  Japan.
61-237614 10/1986  Japan.
332322    9/1970  U.S.S.R..

(List continued on next page.)

OTHER PUBLICATIONS

Molle, Raoul, Comparative Study of Outlet or Discharging Devices, Microtecnic vol. X, No. 1, pp. 16–24, 1956.

S. A. Ginsberg, et al., The Fundamentals of Automatics and Telemechanics, Moscow, the "Energy" Publishers, 1968, p. 364 (Translated in part).

(List continued on next page.)

*Primary Examiner*—Jill L. Heitbrink
*Attorney, Agent, or Firm*—Willian, Brinks, Olds, Hofer, Gilson & Lione

[57] ABSTRACT

A molding system including a mold and a molding machine has been adapted to monitor the position of mold element surfaces that move relative to each other to form a mold cavity. The system includes a source of gas under pressure and orifice-forming sensors on a first mold element to direct a flow of pressurized gas from the first mold element. A monitoring system monitors the condition of the gas remote from the first mold element to indicate the spacing between the first mold element and one or more adjacent mold elements as the mold elements move with respect to each other. The molding system can monitor the operation of large, complex die-casting molds that include a plurality of slides movable transversely to the movement of the molding machine and measures and indicates misalignment and warping of die elements, failure of the die elements to close and open properly, and other such irregularities in operation in the presence of the extremely high forces imposed upon the molds by the molding machine, high temperatures and hostile environment and to protect molds and molding machine parts from destructively high forces and to prevent or record manufacture of reject parts.

8 Claims, 16 Drawing Sheets

U.S. PATENT DOCUMENTS

| | | | |
|---|---|---|---|
| 4,531,901 | 7/1985 | Anderson | 425/150 |
| 4,580,965 | 4/1986 | Wernecke | 425/145 |
| 4,607,525 | 8/1986 | Turner et al. | 73/37.6 |
| 4,696,632 | 9/1987 | Inaba | 425/150 |
| 4,734,869 | 3/1988 | Mickowski | 364/550 |
| 4,824,351 | 4/1989 | Ramsey | 425/135 |
| 4,845,991 | 7/1989 | Presbie | 73/37.5 |

FOREIGN PATENT DOCUMENTS

| | | |
|---|---|---|
| 357470 | 12/1970 | U.S.S.R. |
| 896406 | 3/1980 | U.S.S.R. |
| 1041207 | 2/1982 | U.S.S.R. |
| 1105277 | 6/1982 | U.S.S.R. |
| 1468649 | 8/1987 | U.S.S.R. |

OTHER PUBLICATIONS

A. V. Vysotsky et al., Design and Adjustment of Pnuematic Devices for Linear Measurements, Moscow, Mashinostrogenie Publishers, 1972, pp. 16–17 (Translated in Part).

O. B. Balakshin, Automation of Pnuematic Control of Dimensions in Machine Building, Moscow, Machinostrogenie Publishers, 1964, pp. 125–126.

Fig.15

MOLDING AND GAUGING METHOD

This application is a continuation of U.S. patent application Ser. No. 07/487,954, filed Apr. 19, 1990 now abandoned and PCT/US88/03561 filed Oct. 13, 1988, which is a continuation in part of U.S. patent application Ser. No. 07/108,484 filed Oct. 14, 1987 which is now U.S. Pat. No. 4,824,351.

DESCRIPTION

1. Technical Field

This invention relates to a molding and gauging system that is adapted to sense misalignment and warping of die elements, failure of die elements to close properly, and other irregularities in operation, and, more particularly, to a molding and gauging system for die-casting and plastic-molding operations where extreme forces are exerted on molding dies to close the dies and maintain them closed as they are filled with molten aluminum, zinc, or other such metals or plastics under extremely high pressures.

2. Background Art

In recent years, the use of die casting and plastic molding has been extended to the manufacture of larger and larger articles and has been extended to the manufacture of articles with closer and closer tolerances.

Such large automotive parts as internal combustion engine blocks and the housings of automatic transmissions are now commonly manufactured with die casting as the first step in formation of the part. Such parts have extensive and complex surfaces with close tolerances; and die casting now permits their formation, eliminating costly machining operations and saving metal. Die casting of such large parts as engine blocks and transmission housings requires massive dies. Extreme pressures are exerted on the liquid metal during the die casting operation, and large amounts of heat are extracted from the molten metals as they change state. The maintenance of dimensional tolerances within close limits makes such operations economically attractive. The strength to withstand the stresses resulting from high pressures and forces requires massive dies. The molds for die casting such large automotive parts as automatic transmission housings, for example, are frequently seven to eight feet (2.1–2.5 meters) tall, seven to eight feet (2.1–2.5 meters) wide, and six to seven feet (1.8–2.1 meters) thick when closed and must be manufactured from high-grade, high-tensile strength steel.

Such molds frequently include one stationary element, one movable element operated by the die-casting machine to close the mold, and several slideable elements, referred to as "slides", that move transversely of the direction of movement of the die-casting machine to provide the mold cavity with intricate and re-entrant surface configurations. The mold slides which slide transversely of the direction of movement of the die-casting machine are generally moved by hydraulic cylinders to their proper position. As the mold is closed by the die-casting machine, surfaces on the slides are engaged by the other mold elements or parts in such a manner that when the mold is closed, interengaging surfaces, such as ramps, on the slides and on the other mold parts are clamped and held together by the die-casting machine to prevent the high pressure of the injected, molded metal from moving the sliding mold elements or parts.

A large die-cast part, such as an aluminum housing for an automatic transmission, can be fifteen to twenty inches (0.38–0.5 meters) in diameter and have a length of up to two feet (0.6 meters); and the surface area of the mold cavity exposed to the pressure imposed on the liquid molten metal by the die-casting system can equal several hundred square inches (or over one thousand square centimeters).

In die-casting operations, high liquid metal pressure is needed to fill quickly the intricate cavities of die-casting molds and avoid solidification of the molten metal as it is cooled by the die. High pressure is also needed to prevent the formation of voids in thick walls formed in the molded part. When the cross section of a mold cavity is designed to provide a relatively thick section of, for example, three-eights of an inch (about one centimeter) or thicker, the molten metal at the surface of the mold cools significantly before the interior and, because of metal shrinkage on cooling, can leave voids within a thick cross section. Thus, in large parts, pressures up to 20,000 psi. (1406 kg/cm$^2$) are exerted on the molten metal to fill the die quickly and prevent the formation of voids within the thick sections; and the pressure of the molten metal can exert millions of pounds (millions of kilograms) of force on the surfaces of the mold cavity. To prevent the millions of pounds (millions of kilograms) of force exerted by the molten metal against the die surfaces from moving the die surfaces outwardly from their intended position, the die-casting machine is operated to preload the mold prior to the shot of molten metal; that is, by the use of ramp-engaging surfaces on the movable mold parts, the die-casting machine locks the movable parts of the die-casting mold together with the imposition of millions of pounds (millions of kilograms) of force on the ramp-engaging surfaces to hold the movable die-casting elements fixed in their designed, closed position. The force imposed, for example, by a 350-ton (317,000 kilogram), die-casting machine, which is not among the largest of such machines, can reach seven hundred thousand pounds (317,000 kilograms); and this force in larger machines, such as 3,500-ton machines can reach 7,000,000 pounds (3,171,000 kilograms). Such high forces, if imposed on misaligned or jammed partially closed dies, can deform and break mold surfaces and the mold-operating surfaces of the die-casting machine. Die-casting molds for such large parts must, therefore, be designed to withstand such extreme forces and to use the extreme forces imposed by the die-casting machine to prevent movement of the mold slides outwardly as the molten, die-casting metal is injected into the mold under pressures of several tons per square inch (several hundred kilograms per square centimeter).

Die-casting has become desirable as a manufacturing method for parts such as automobile engine blocks and transmission housings because it can produce intricately shaped parts to close tolerances. Thus, die casting can provide such parts with operating strength and intricately shaped surfaces without extensive and expensive machining operations. Such parts are, however, long and have wall thicknesses designed to take advantage of the economy of die-casting operations. Misalignment of the mold parts, due, for example, to warping of the mold, misalignment of the mold on the molding machine, or non-parallelism in the molding machine platen surfaces or their direction of the movement, can reduce wall thicknesses and distort part surface dimensions to unacceptable limits and result in a substantial waste of die-cast parts. Extensive time is required to inspect such complexly shaped parts completely, and failure to detect poorly cast parts before machining can result in further waste. In addition, failure of the dies to close completely can result in overly thick walls that include excess wasted metal. The presence of such excess wasted metal in parts that are produced in large quantities can provide a very expensive and wasteful operating expense.

Furthermore, as indicated above, if the movable mold parts, including the transversely moving mold slides, are not properly aligned as the mold elements are closed to form the cavity, and if the die-casting machine imposes its millions of pounds (millions of kilograms) of force on misaligned mold parts, the force imposed by the die-casting machine may break the mold or parts of the molding machine which operate the mold. Such misalignments can result from undetected trapped flash or dies that become worn through use or operation under high temperatures and stresses. Aluminum has a high latent heat of fusion, reported to be 76.8 gram calories per gram; and a fifty-six pound (over 25-kilogram) aluminum casting, which is typical of aluminum engine blocks and automatic transmission housings, requires the dissipation in the mold of over 7,700 btu's (about 2000 kilogram-calories) every minute or two. Although such large die-casting molds are generally cooled by water forced through cooling passages drilled within the mold elements, the large die-casting molds frequently rise in temperature to 300° to 600° F. (150° to 315° C.) and operate at such elevated temperatures. Such high temperatures, of course, prevent human operators from working too close to the mold surfaces because of the danger of burns and other injuries.

Misalignment of die-casting mold elements, failure of the die-casting machine to provide parallel platen surfaces and movement perpendicular to the platen surfaces, wear of the die elements, and failure of die elements to close properly all cause similar problems in conducting plastic-molding and die-casting operations to manufacture smaller, high-precision parts, notwithstanding the substantially reduced forces presented by such operations. Where plastic-molding and die-casting operations are used to manufacture small precision parts having intricate surfaces with close tolerances, misalignment of the mold surfaces and failure of the mold surfaces to close correctly result in parts that fall outside the close dimensional design tolerances and must be rejected.

Air gauges, which comprise a nozzle through which air is discharged against some body or member to determine the distance from the nozzle to the body or member, are known, for example, in U.S. Pat. Nos. 3,277,914; 3,467,122; and 3,543,779. Also known are various molding machine control systems to eliminate mechanical limit switches to sense die closure electrically, pneumatically, and remotely from the molding machine, to provide control of machine-operating speeds, pressures and metal injection rates, and to provide parallelism between molding machine platens. See, for example, U.S. Pat. Nos. 3,632,251; 3,942,928; 4,131,596; 4,531,901; 4,580,965; and 4,696,632. The above patents do not disclose or suggest the invention of this application, address the problems solved by this invention, or provide the advantages and features of this invention.

DISCLOSURE OF INVENTION

This invention is a molding and gauging system that is adapted to sense misalignment and warping of die elements, failure of the die elements to close properly, movement of die elements resulting from filling the cavity, distortion from unequal heating of the die elements, failure of the die elements to open properly, and other such departures from intended operation. The system of this invention can provide an alarm to the operator in the event of such malfunctions, automatically interrupt operations to prevent machine breakage and manufacture of rejects, and provide a continuous record of molding operations to permit the verification of correctly manufactured parts and the identification of parts that may be incorrectly manufactured. Because the system can detect irregularities in operation before forces are imposed upon the molds by the molding machine and before molding materials are injected into the "mold cavity, molds and molding machine parts can be protected from destructively high forces and the manufacture of reject parts.

This invention includes a molding system, including a mold and a molding machine, that has been adapted to monitor and indicate the position of first and second mold surfaces that move with respect to each other and form a mold cavity. The invention is preferably incorporated into the mold although it may be incorporated into the molding machine. The system includes a source of gas, preferably air, under pressure, means on a first molding system surface to direct a flow of pressurized gas from the first molding system surface, and a monitoring means to monitor the flowing gas remote from the first molding system surface to indicate the spacing between the first molding system surface and a second molding system surface as the first and second molding system surfaces move with respect to each other or when there is no relative motion. The monitoring means can indicate the spacing between the first and second molding system surfaces directly and, in more sophisticated embodiments, can provide one or more outputs useful to automatically signal when the first and second molding system surfaces are not properly spaced and to control operations to prevent the mold from being damaged or reject parts from being formed.

A mold for use with this invention includes at least first and second elements adapted to be moved together to define a closed mold cavity. In the invention, means, located at the first mold element surface portion adapted to adjoin the second mold element, directs a flow of gas at the adjacent portion of the second mold element. Such means preferably comprises a "sensor" forming an orifice of known area and a passageway leading from such orifice and adapted to be connected to a source of gas under pressure. In preferred systems, the passageway is preferably provided in the first mold element; and the passageway leads from a separate orifice-forming element to a mold element surface conveniently located for connection to other parts of the system. In preferred systems, the monitoring means includes a second orifice in the passageway leading to the first orifice, and a pressure-sensitive output device connected to sense the pressure in the passageway between the first and second orifices. Such a pressure-sensitive device is preferably a transducer to convert pressure in the passageway between the first and second orifices into an electrical signal as set forth below.

Preferred systems of the invention further include means connected with the transducer to interpret the electrical signal and produce outputs indicative of the spacing between the molding system surfaces. Such means preferably comprises a microprocessor, connected with the transducer, including a central processing unit and a random access memory, and means to relate the output of the transducer to the spacing between the first and second molding system surfaces and to store indicia of the spacing in the random access memory of the microprocessor. The microprocessor in such systems has an operating program to compare the transducer output with the stored indicia in its random access memory and calculate the spacing between the first and second molding system surfaces and produce an output indicative of the spacing. A digital computer can be used to calibrate the system and relate the output of the transducer to the spacing between the first and second molding system surfaces. Such a digital computer can be provided with a calibration program to sample the output of the transducer a specified number of times in the specified time space and to generate an indicia of the spacing between the first and second molding system surfaces based upon a calculated mean of the transducer output and to store the indicia in the random access memory of the microprocessor for use in the operating system.

In more extensive systems of the invention, a die-casting system, for example, can include molds having a stationary member or element, and movable mold members or elements, including one or more movable die elements or "slides" that are adapted to move transversely of the direction of the movement of the movable die member by the die-casting machine. Such systems can be provided with a plurality of air-directing outlets. The air-directing outlets can be located at a stationary surface of the stationary die member or at adjoining surfaces of movable mold elements or slides, and the air-directing outlets can determine the spacings and positions of the surfaces of the plurality of die elements with respect to one another. The invention can be used to monitor the operation of complex molds that include a plurality of mold elements or slides that move transversely of the motion of the molding machine in defining a mold cavity in which a part is formed and can provide measurements of the displacement of a plurality of movable mold elements from their intended positions throughout the formation of parts with the mold.

Such more extensive systems can include a plurality of air-directing outlets directed to indicate, for example, the spacing between one die element and a plurality of positions on another movable die element and detect a lack of parallelism between the two adjacent die elements. In such systems, a source of gas under pressure, preferably "factory air" after filtering and drying, is connected to a manifold; the manifold is connected to the plurality of air-directing outlets; and the pressure of the air from the manifold is controlled by air-pressure-regulating means. In such systems, a plurality of monitoring means, one for each of the air-directing outlets, monitors the pressure of the air to each of the plurality of air-directing outlets and provides signals indicative of the spacings between the mold elements for use in the system. In such more extensive systems, each of the transducers may be connected to the microprocessor which can compare the output of each of the transducers with the information stored in its random access memory, calculate the spacing between the surface at each of the air-directing outlets and the adjacent die elements throughout the cycle of operation of the molding system, and compare the spacings of the die elements with proper spacings and with each other to determine misalignment and failure of the die elements to properly close and other such irregularities and departures from intended operation, thereby avoiding damage to the die elements and the die-casting machine and preventing the manufacture of parts that do not meet the tolerances that have been designed into the molding system.

In a particularly preferred embodiment of the invention, the system comprises one assembly including a central-processing unit, a random access memory, one or more output devices, such as, preferably, a CRT or printer, and one or more input devices, such as a keyboard and magnetic disk-operating system, and another assembly including a manifold adapted to supply air at a known pressure to a plurality of outputs adapted for connection to one or more molds that have been provided with orifice-forming "sensors", transducer means on the manifold connected with the central-processing unit to provide the system with the supply air pressure data in digital form, and a plurality of monitoring means, each of said monitoring means communicating with one of the plurality of outputs of the manifold and including an air restriction and a transducer means connected with the central-processing unit to provide the system with air pressure data in digital form indicative of the pressure present at a connected orifice-forming sensor of one of the molds.

In the operation of the particularly preferred embodiment of the invention, the central-processing unit is programmed to "read" the supply air pressure and the air pressures present at the connected orifice-forming sensors at a sufficient number of intervals to provide reliable average values, to calculate dimensionless pressure ratios therefrom and to determine the displacement of the sensors from their intended positions. The central-processing unit can be programmed to combine such empirical flow coefficient variables of the system as air density, kinematic viscosity and Reynolds number, and passage roughness and obstruction parameters into a dimensionless parameter that can be reliably determined by calibration and further programmed to calculate, from the data on the known air pressure of the manifold and the measured air pressure present at each of the orifice-forming sensors and known dimensions of the system, the displacement of the sensor from its intended position in a mold, using the applicable stored calibration data on the empirical flow coefficient variables.

The operation of the particularly preferred system of the invention thus provides a conveniently usable, user-friendly system that can monitor the operation of one or more complex molds, each of which may have one or more mold elements and slides that move transversely to the motion of the molding machine and can provide, in real time and with reasonable accuracy in the presence of temperatures exceeding 1000° F. (538° C.) air pressures exceeding tens of thousands of pounds per square inch (thousands of kg/cm$^2$), the dimensions of a die-cast part as the metal solidifies in the mold cavity.

Other features and advantages will be apparent from the drawings and detailed descriptions that follow.

BRIEF DESCRIPTION OF DRAWINGS

FIG. 15 is a drawing of a cathode-ray tube output of a preferred system of this invention.

BEST MODE FOR CARRYING OUT THE INVENTION

Figure 1:
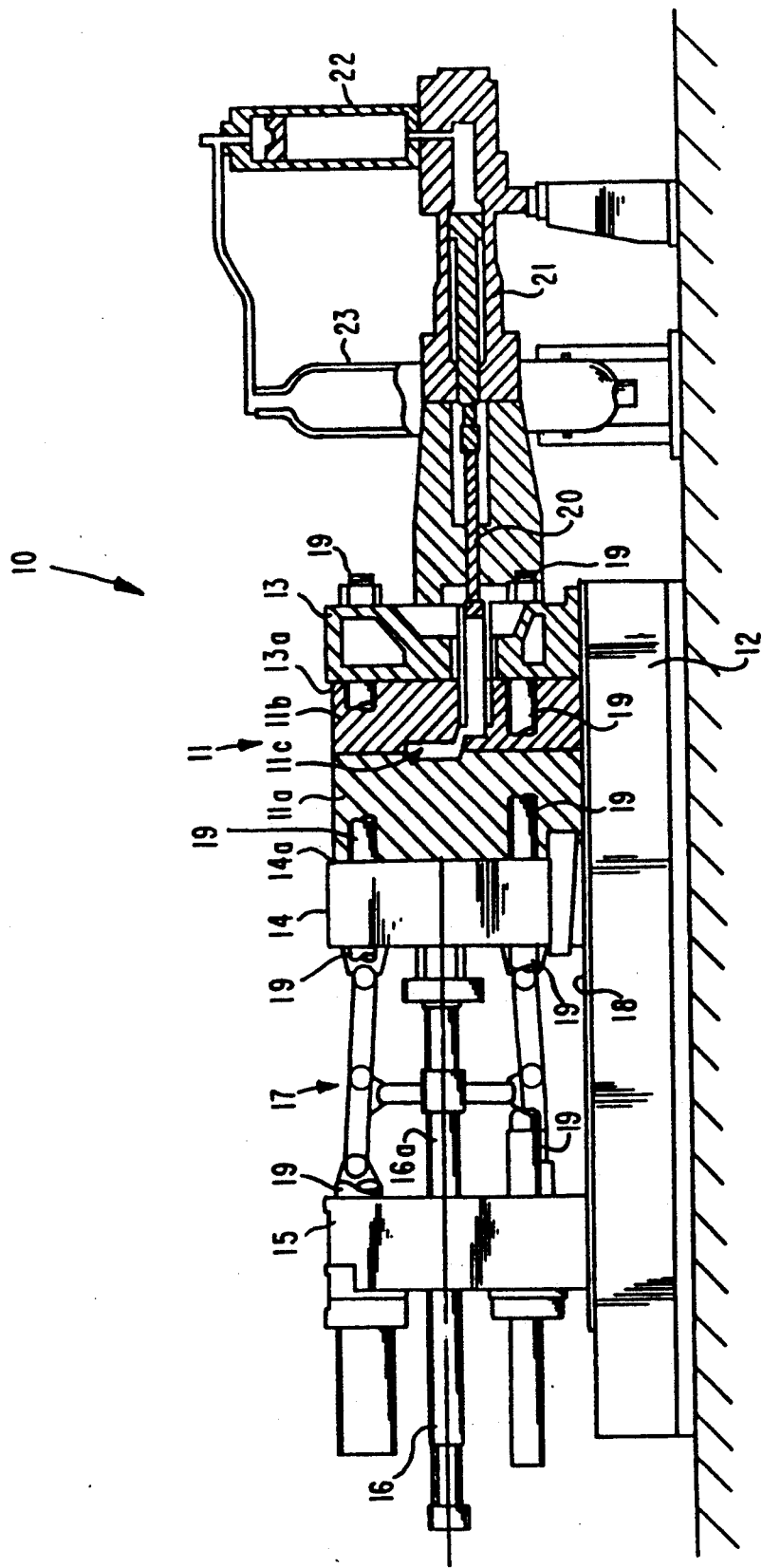
FIG. 1 is a cross section of a typical horizontal die-casting machine.

FIG. 1 is a cross-sectional and diagrammatic view of a typical, horizontal, die-casting machine 10. The die-casting machine is designed to open and close a die-casting mold 11, frequently referred to as a die, including a movable element 11a and a stationary element 11b. The die-casting machine includes a base 12 adapted to support a stationary platen 13 and a movable platen 14. Stationary platen 13 and movable platen 14 are supported by the base in such a manner that their vertical surfaces 13a and 14a, respectively, are parallel. The parallel nature of vertical surfaces 13a and 14a of the platens of the die-casting machine is important to ensure that parallel surfaces provided on movable portion 11a and stationary portion 11b of mold 11 remain parallel when the die is installed in the machine and properly closed as moving platen 14 is moved by the die-casting machine toward stationary platen 13. As shown in FIG. 1, the die-casting machine also includ a lin. housing 15 carried by base 12 and a hydraulic cylinder 16 carried by link housing 15 with its piston moving horizontally. A piston 16a of hydraulic cylinder 16 is connected to a toggle link assembly 17. Toggle link 17 provides a large mechanical advantage, multiplying the force imposed by piston 16a of hydraulic cylinder 16 many times to move moving platen 14 toward stationary platen 13 and, upon engagement of the interfacing surfaces of movable die element 11a and stationary die element 11b, to apply extremely high forces to press movable die element 11a against stationary die element 11b to resist the separating forces imposed upon die elements 11a and 11b by the liquid metal charge forced into a cavity 11c formed in die 11.

As shown in FIG. 1, molten metal is forced in cavity 11c by a movable plunger or piston 20. The piston is moved forward by a shot cylinder 21; and upon completion of the forward stroke of piston 20, the plunger is exposed to an extremely high intensification pressure, frequently in the range of 5,500 to 20,000 psi. (350 to 1400 kg./cm²). The intensifier includes an isolating hydraulic piston assembly 22 and high pressure gas container 23 connected with isolating piston 22 in such a manner that as piston 20 has filled cavity 11c with molten metal, the high pressure of high pressure container 23 is applied to isolating piston assembly 22 and through the hydraulic fluid to piston 20 to exert pressures such as 5,500 to 20,000 psi. (350 to 1400 kg/cm²) on the molten metal within cavity 11c. To prevent the extreme high pressures of the molten metal from forcing die elements 11a and 11b apart, die-casting machine 10 through toggle link 17 can apply forces of several million pounds, and up to 70,000,000 pounds (3,171,000 kilograms), to moving platen 14.

As shown in FIG. 1, moving platen 14 and movable die 11a are supported by rails 18 on the base; and both movable platen 14 and movable die member 11a are carried and guided by tie bars 19 extending between stationary platen 13 and link housing 15 supported by base 12. Tie bars 19 must carry the force imposed by piston 16a and toggle link 17 and imposed, through moving platen 14 and mold 11, on stationary platen 13. Stationary platen 13 and link housing 17 are held together by tie bars 19 to permit the extreme forces to be imposed upon die elements 11a and 11b by toggle link 17 of the die-casting machine. Tie bars 19 are broken away in FIG. 1 so that they will not restrict the view of toggle link 17 and die elements 11a and 11b (which are shown in cross section).

As shown further in FIG. 1, if the interfacing surfaces of die elements 11a and 11b are prevented by an incompressible material, such as flash, from mating and are held spaced apart, the designed preloading force to be applied by the die-casting machine through toggle link 17 can be many times greater than anticipated and can reach levels sufficient to break the toggle link assembly or tie bars of the die-casting machine. As noted above, the forces imposed by the die-casting machine are frequently in the range from 7,000,000 to 70,000,000 pounds (3,171,100 to 31,710,000 kilograms).

Figure 2A:
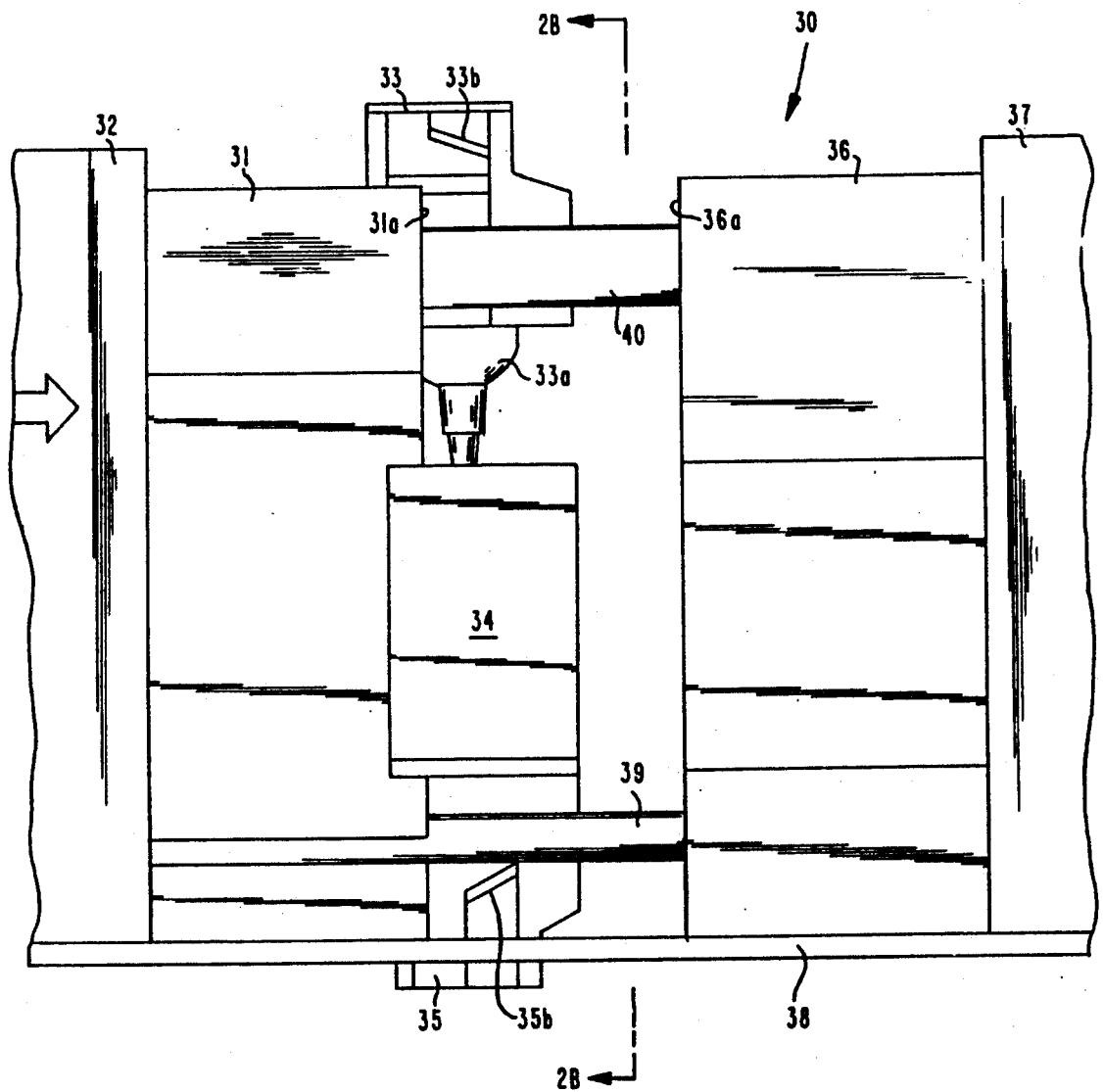
FIG. 2A is a side view of a typical mold for the housing of an automatic transmission of an automobile in the open position.
Figure 2B:
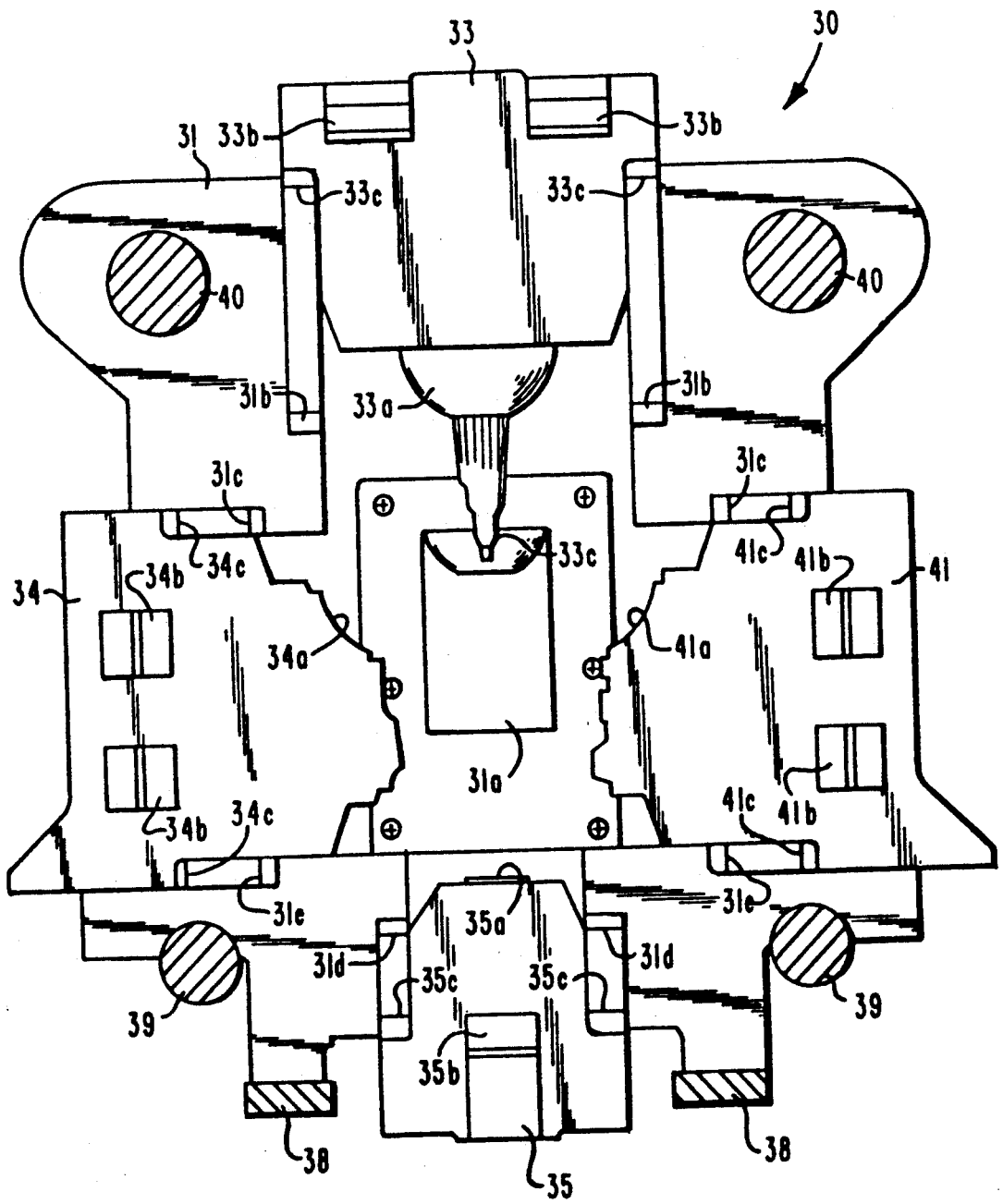
FIG. 2B is a cross-sectional view taken on line 2B—2B of the mold of FIG. 2A, showing the movable carrier of the mold and the plurality of transversely moving mold slides to form the interior of the transmission housing, its upper most surface (by the carrier) and its outer and end portions.
Figure 3:
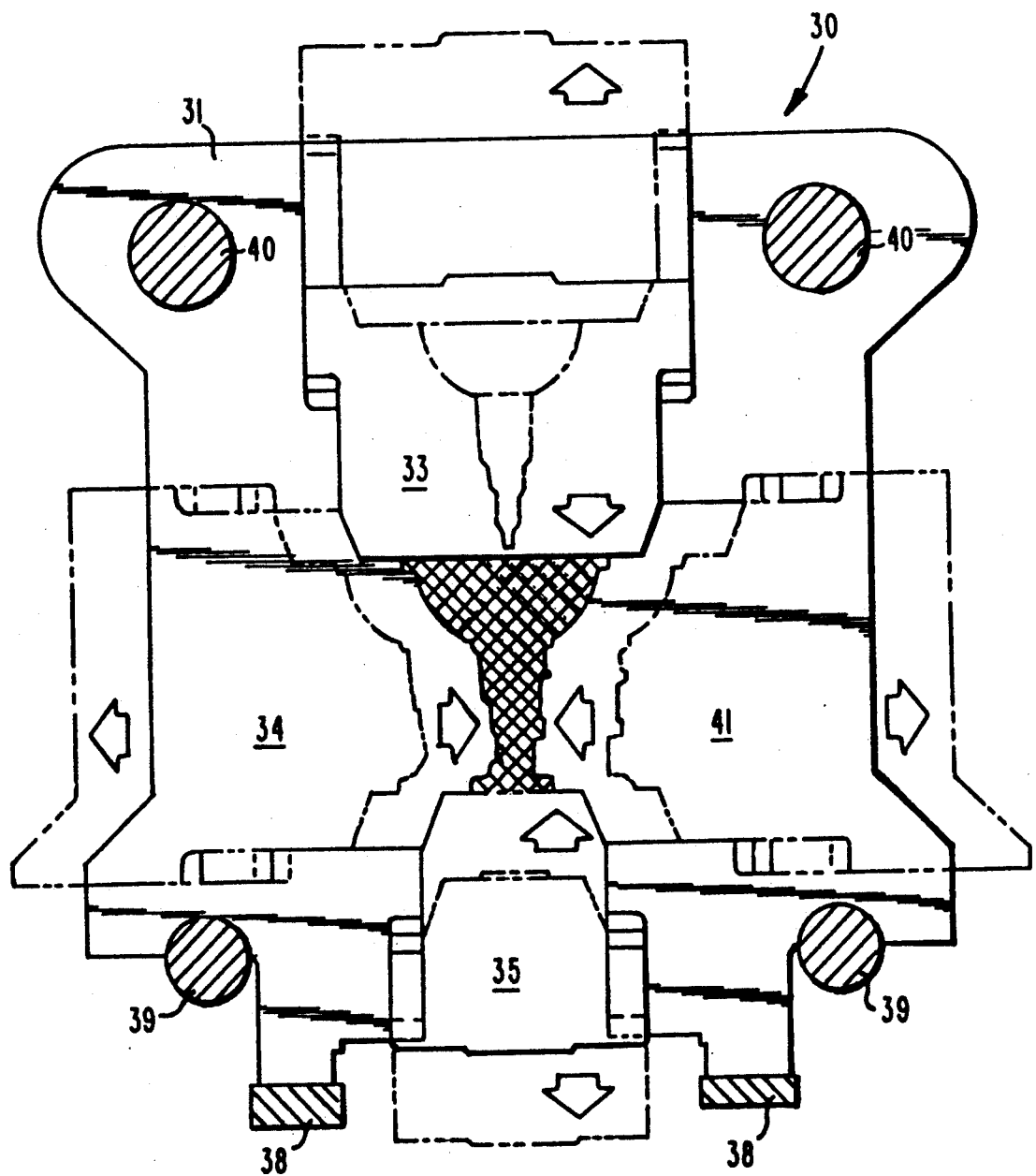
FIG. 3 shows the mold of FIG. 2B in schematic form indicating the position of the slides in phantom lines with the mold open, the position of the slides in solid lines with the mold closed, and arrows indicative of the motion of the slides as the molds are closed.

FIGS. 2-4 illustrate a mold to form from aluminum, for example, the housing for an automatic transmission for an automobile.

FIG. 2A is a diagrammatic side view of a molding system 30 with the mold in the open position. As shown in FIG. 2A, the mold includes a movable mold element, or carrier, 31 mounted on the face of a movable platen 32 of a molding machine and carrying a plurality of transversely sliding mold elements, namely, a top slide 33 including a surface portion 33a shaped to form the interior surface of the automatic transmission housing, a side slide 34 having an interior surface shaped to form a portion of the outer surface of the automatic transmission housing (not shown), and a bottom slide 35 shaped to form the end of the automatic transmission housing. Another side slide 41 is carried by mold element 31 as shown in FIG. 2B. The mold system also includes a stationary die element 36 including interior portions (not shown) which cooperate with the cavity-forming surfaces of movable die element 31 and sliding die elements 33, 34, 35, and 41 (shown in FIG. 2B) to complete the formation of an internal cavity when movable element 31 is closed by movable platen 32 of the die-casting machine to force the interfacing and mating surfaces 31a and 36a of die element 31 and die element 36 into engagement. Prior to the movement of movable die element 31 into engagement with stationary die element 36, sliding die elements 33, 34, 35, and 41 (shown in FIGS. 2B, 3, and 4B) are moved transversely and preferably perpendicularly to the direction of motion imposed on movable die element 31 by movable platen 32 of the die-casting machine. Slides 33, 34, 35, and 41 (FIG. 2B) are moved by separate hydraulically driven pistons mounted on die element 31 and fastened one to each of slides 33, 34, 35, and 41 (FIG. 2B) to move the slides as shown in FIG. 3. The mounting and operation of such hydraulic piston-cylinders to drive the slides of a die-cast mold are well known in the art, and the hydraulic piston-cylinder drives are omitted from FIGS. 2-4 for clarity.

As shown in FIG. 2A, top slide 33 includes ramp-like surfaces 33b; and the bottom slide includes a ramp-like surface 35b. In the sequence of operation of molding system 30, the hydraulic drives for slides 33, 34, 35, and 41 drive the slides inwardly into their cavity-forming position. As the die-casting machine, through movable platen 32, moves movable die element 31 to the right, as shown in FIG. 2A, cooperating ramp-like surfaces (not shown) formed on the interior surfaces of stationary die element 36 engage ramp-like surfaces 33b and 35b and engage ramp-like surfaces on the other slides 34 and 41 of the die (not shown in FIG. 2A). The application of the extreme force by the die-casting machine imposes these extreme forces on ramp-like surfaces 33b and 35b to hold top slide 33 and bottom slide 35 in their correct cavity-forming position. Die elements 31 and 36 are carried on rails 38 and are guided by tie rods 39 and 40 of the die-casting machine.

FIG. 2B is a view of the carrier and slides of mold system 30 taken along section 2B—2B of FIG. 2A. FIG. 2B shows the arrangement of slides 33, 34, and 35, and the other side slide 41, which was opposite side slide 34 and not visible in FIG. 2A. As shown in FIG. 2B, movable die element 31 which serves as a carrier for the slides includes an interior portion 31a including surfaces designed to cooperate with the cavity-forming surfaces of die elements 33, 34, 35, 36, and 41 to form the automatic transmission housing. Interior surfaces 34a of slide element 34, 35a of slide element 35, and 41a of slide element 41, as well as a more complete view of the exterior of cavity-forming surface 33a of top slide element 33, are shown in FIG. 2B. Also visible in FIG. 2B are ramp-like surfaces 33b of slide element 33, 34b of slide element 34, 35b of slide element 35, and 44b of slide element 41. The ramp-like surfaces of the slides are omitted from FIGS. 3 and 4.

Each of slides 33, 34, 35, and 41 also includes a "stop", that is, a surface which abuts a corresponding "stop" on carrier element 31 to position the slide transversely of the axis of movement of carrier 31. As shown in FIG. 2B, slide element 33 includes stops 33c which abut coacting stops 34b of carrier 31 when the mold is closed; slide 34 includes stops 34c which abut coacting stops 31c of carrier 31 when the mold is closed; slide 35 includes stops 35c which abut coacting stops 31d of carrier 31 when the mold is closed; and slide 41 includes stops 41c which abut coacting stops 31e of carrier 31 when the mold is closed. As known in the art, the ramp-like surfaces and stops of the mold are preferably formed as separate, hardened, steel elements that are bolted to the mold elements. After the mold is closed and the slide stops are abutting the carrier stops, the application of further force by the die-casting machine to the carrier "preloads" the slides (i.e., applies forces to the slides to force their stops against the coacting stops of the carrier) to prevent movement of the slides as the mold cavity is filled with liquid metal at high pressure. The location of the stops on the mold elements is an important part of the set up of the die since the stops determine the position of the slides when the mold is closed. In setting up a die, the separate stop elements are frequently "shimmed" with thin pieces of metal to adjust the location of slides when the mold is closed.

FIG. 3 corresponds to FIG. 2B and shows the mold system with the slides closed in solid lines and indicates the molding system with the slides open in phantom line. FIG. 3 includes arrows showing the transverse motion of slides 33, 34, 35, and 41 as they are moved with respect to the die element or carrier 31 by their respectively independent hydraulic drive systems.

Figure 4A:
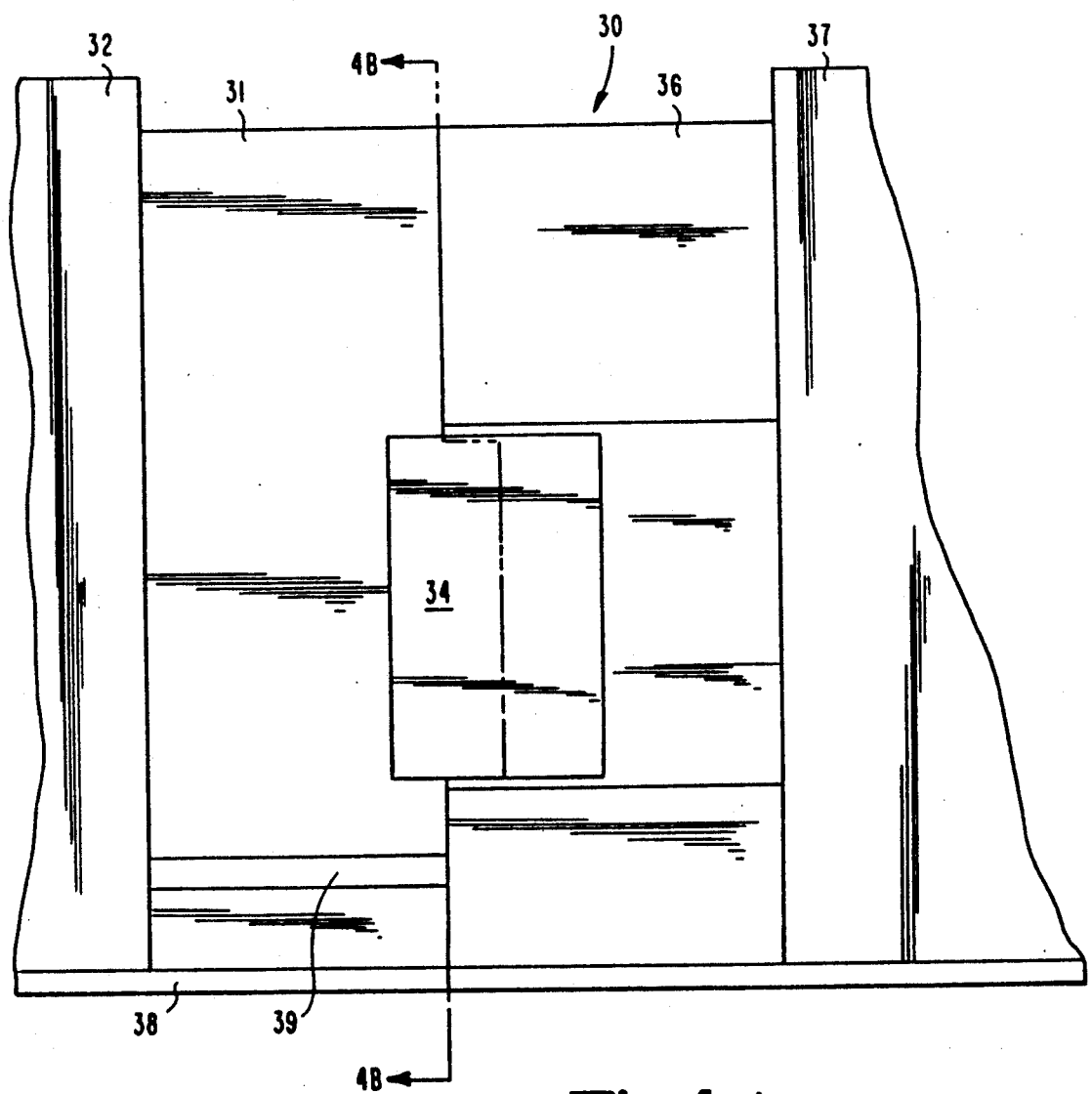
FIG. 4A is a side view of the mold of FIGS. 2A and 2B in the closed position.
Figure 4B:
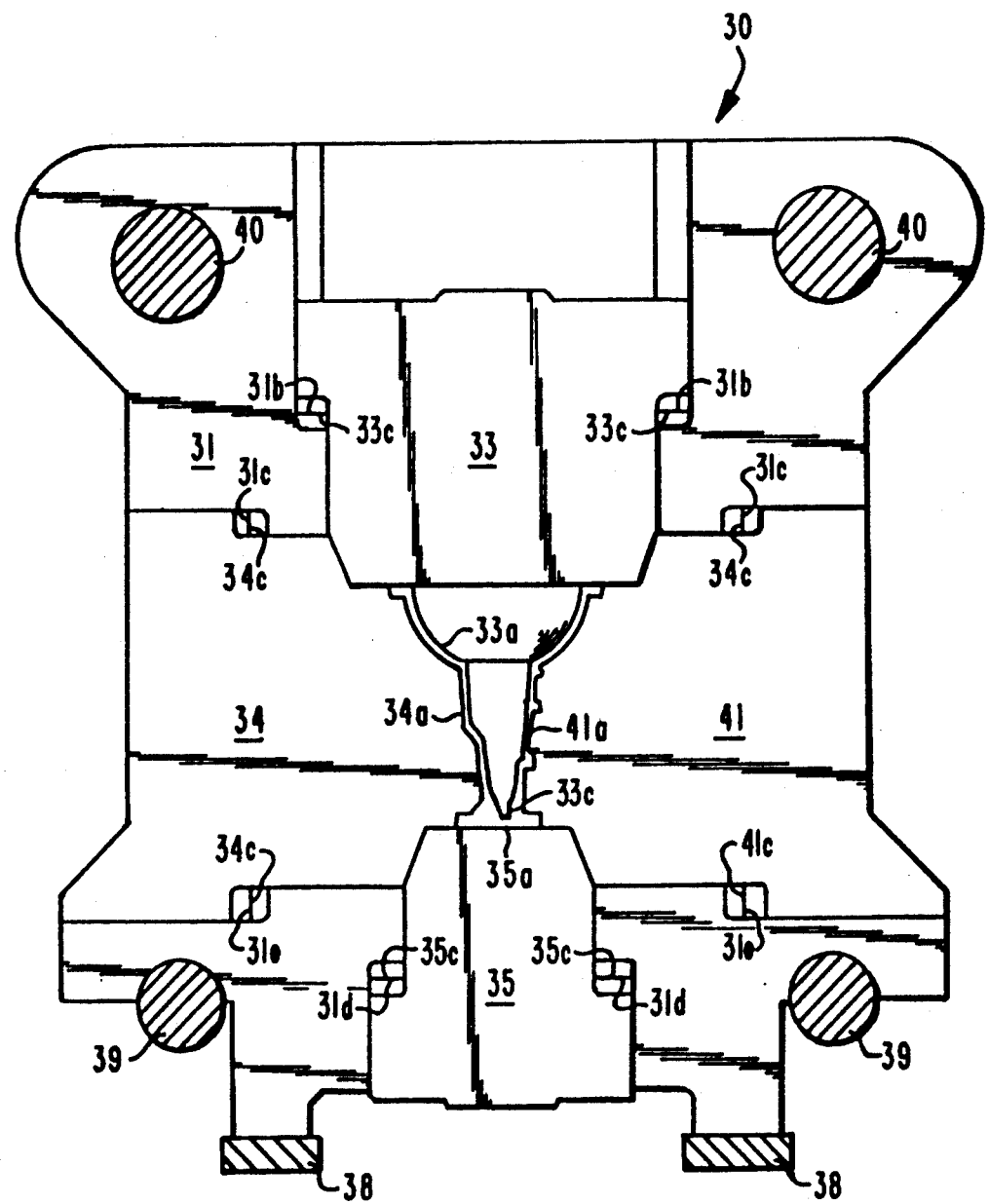
FIG. 4B is a cross-sectional view taken on line 4B—4B of the mold system of FIG. 4A showing the position of the slides with the mold closed and indicating a cross section of the cavity formed by the mold.

FIGS. 4A and 4B correspond, respectively, to FIGS. 2A and 2B and show mold system 30 in the closed position. FIG. 4B is a cross section of FIG. 4A taken along the lines 4B—4B of FIG. 4A. Section 4B—4B is taken along the parting line (that is the interface between mold elements 31 and 36) but offset through the center line of the mold cavity to more clearly show the manner in which the mold elements define the housing of an automatic transmission. In the position shown in FIG. 4A, the die-casting machine through movable platen 32 applies forces reaching millions of pounds to molding system 30 to clamp and wedge molding system 30 in the closed position and to prevent molding elements 31 and 36 from being forced apart, that is, so no spacing occurs between die elements 31 and 36, when exposed to the pressure imposed on the liquid metal as it is forced into the mold cavity. Through the high forces imposed on movable die element 31 by movable platen 32 of the die-casting machine and its transfer via ramp-like surfaces 33b of top slide 33, 34b of side slide 34, and 44b of side slide 41, and 35b of bottom slide 35 (FIG. 2B), slides 33, 34, 41, and 35, respectively, are intended to be held in the proper closed position defined by the adjoining slide and carrier stops as shown in FIG. 4B. In a large part such as a housing for an automatic transmission which requires a slide element such as a top slide element 33 shown in FIGS. 2-4 to form its long interior cavity, even a small, angular displacement from its intended central axis can displace its remote end surface (see 33c in FIGS. 2B and 4B) by many thousands of an inch (or centimeter) and result in the manufacture of a housing with a wall thickness too thin to provide reliable operation and service.

As shown in FIG. 4B, the imposition of pressure on the molten metal injected into the cavity develops forces on slides 33, 34, 41, and 35, forcing the slides outwardly away from the cavity unless they are firmly held in their intended closed position.

Figure 5:
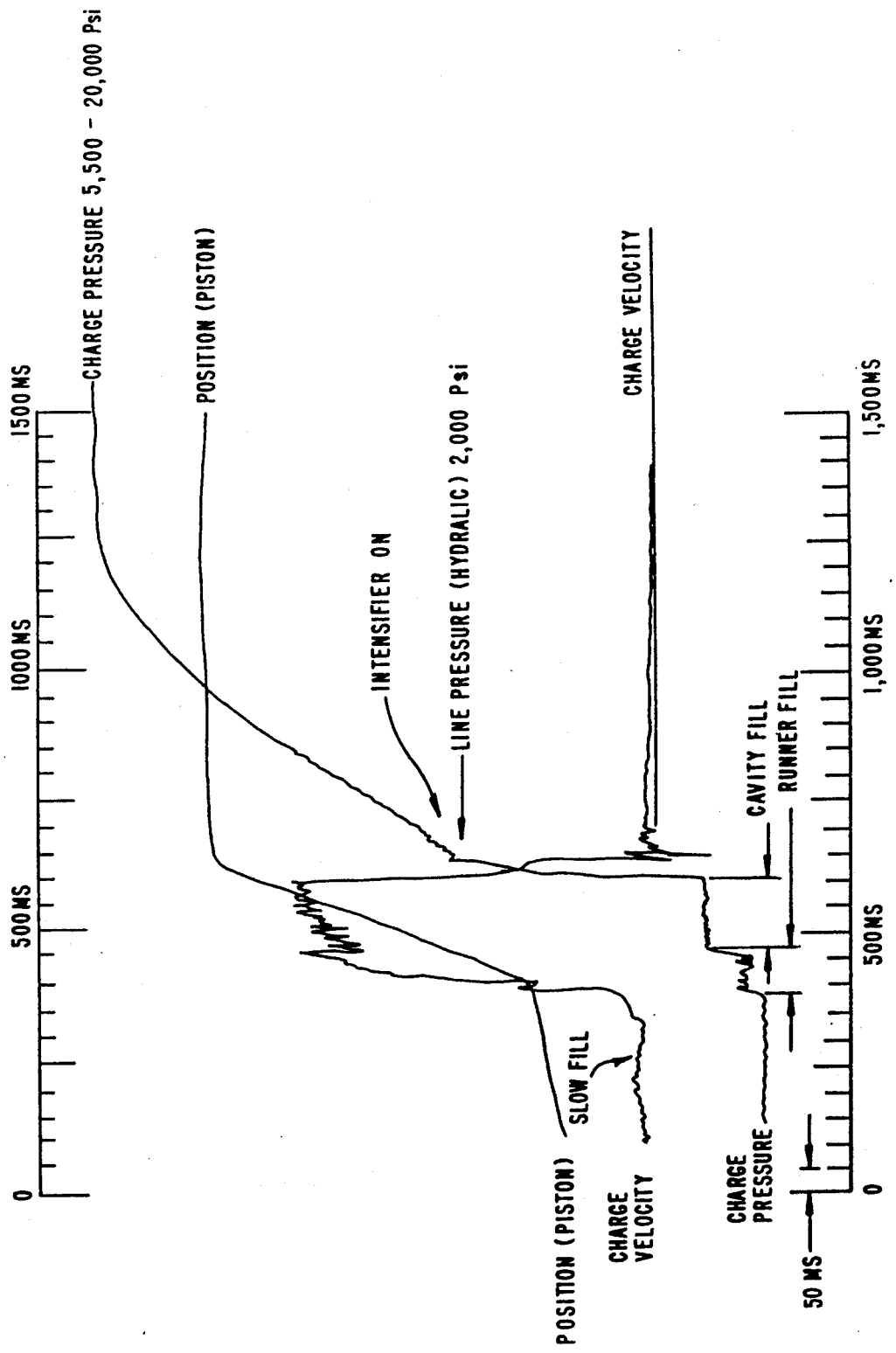
FIG. 5 is a graph showing the relative pressure applied to the charge, the velocity of the charge, and the position of the charge piston during the first one and one-half seconds of a typical die-filling portion of a die-casting cycle.

FIG. 5 is an indication of the flow rate and pressure on the liquid metal during the cavity-filling portion of a die-casting cycle as a result of the motion of the die-casting machine charge piston and the pressure intensifier. As shown in FIG. 5, during the initial one-half second of charging, the charge velocity and pressure are low as the piston begins its motion. From about 0.4 second to about 0.7 second after the beginning of charging, the piston moves more rapidly; and the charge velocity substantially increases as the cavity is filled. As shown in FIG. 5, the charge pressure remains low until the cavity is filled. As the cavity is filled, however, the continued movement of the piston raises the pressure on the liquid metal within the cavity to the hydraulic line pressure applied to the piston which, in the example shown in FIG. 5, is about 2,000 psi. (140 kg/cm$^2$). At this point in the cycle, about 0.7 second after charging has commenced, the very high pressure of the intensifier is applied to the piston and the pressure on the liquid metal increases over the next second to pressures in the range from about 5,500 psi. to 20,000 psi. (380 to 1,400 kg/cm$^2$).

For large castings, such as the aluminum casting for an automatic transmission housing, a complete cycle, including closing the mold, charging the mold, cooling the charge, and opening and clearing the mold requires from about two minutes to about two and one-half minutes.

A typical housing for an automatic transmission may be eighteen to twenty inches (45 to 50 cm.) in diameter and twenty to twenty-four inches (50 to 60 cm. long. Referring to FIG. 4B, if the molten metal, shown in black in FIG. 4B, exerts a pressure of 5,500 psi. to 20,000 psi. (380 to 1400 kg/cm$^2$) on the surrounding surfaces of molding system 30, the forces tending to move mold slide elements 33, 34, 41, and 35 outwardly away from the cavity may reach several million pounds (several million kilograms) acting on each of the slide elements 33, 34, 35, and 41.

Referring now to FIG. 4A, the imposition of pressure such as 5,500 psi. to 20,000 psi. (380 to 1400 kg/cm$^2$) on the liquid metal within the cavity also imposes forces on the order of millions of pounds (millions of kilograms) acting to force mold elements 31 and 36 apart. The die-casting machine, through the imposition of the forces of 350 to 3,500 tons (317,000 to 3,171,000 kilograms) or more, must hold the die elements 31 and 36 closed and hold slide elements 33, 34, 35, and 41 in their designed closed position, notwithstanding the high pressures imposed on the liquid metal charge.

Mold systems, such as mold system 30 shown in FIGS. 2-4 in the presence of the temperatures of molten aluminum and zinc, for example, temperatures in excess of 1200° F. (650° C.), and their engaging surfaces and moving parts must withstand forces of millions of pounds (millions of kilograms) without yielding under stress, fracturing or otherwise failing. Furthermore, during operation, die surfaces have temperatures reaching 600° F. (315° C.); and for even large parts, the dies open only to eighteen to twenty inches (46 to 50 cm.), thus making visual inspection very difficult because of the heat and because of the water, steam, and other vapors present when the mold is open. Of course, any effort to work on the mold surfaces manually during operation while the die is hot is virtually impossible because of the risk of burns to the operator. Die-casting operations necessarily present a hostile environment to human operators.

The invention, however, provides a method and apparatus for safely, reliably, and economically verifying the proper movement and alignment of movable die members prior to the imposition of the extreme high forces of the die-casting machine, the proper position of the movable die members after the molding system is closed and prior to the introduction of molten metal, the extent and location of any misaligned surfaces of a molding die member (i.e., unparallelism or unacceptable departure from the proper axis of a die member and its respective cavity-forming surface, or a spatial displacement of a die member from its designed location of the cavity-forming mold surface), the unintended movement of die members during cavity-charging, and other such departures from normal operation which may lead to damage to the molding system or to the die-casting machine or to the manufacture of die-cast parts with unacceptable departures from their dimensional tolerance limits.

Figure 6:
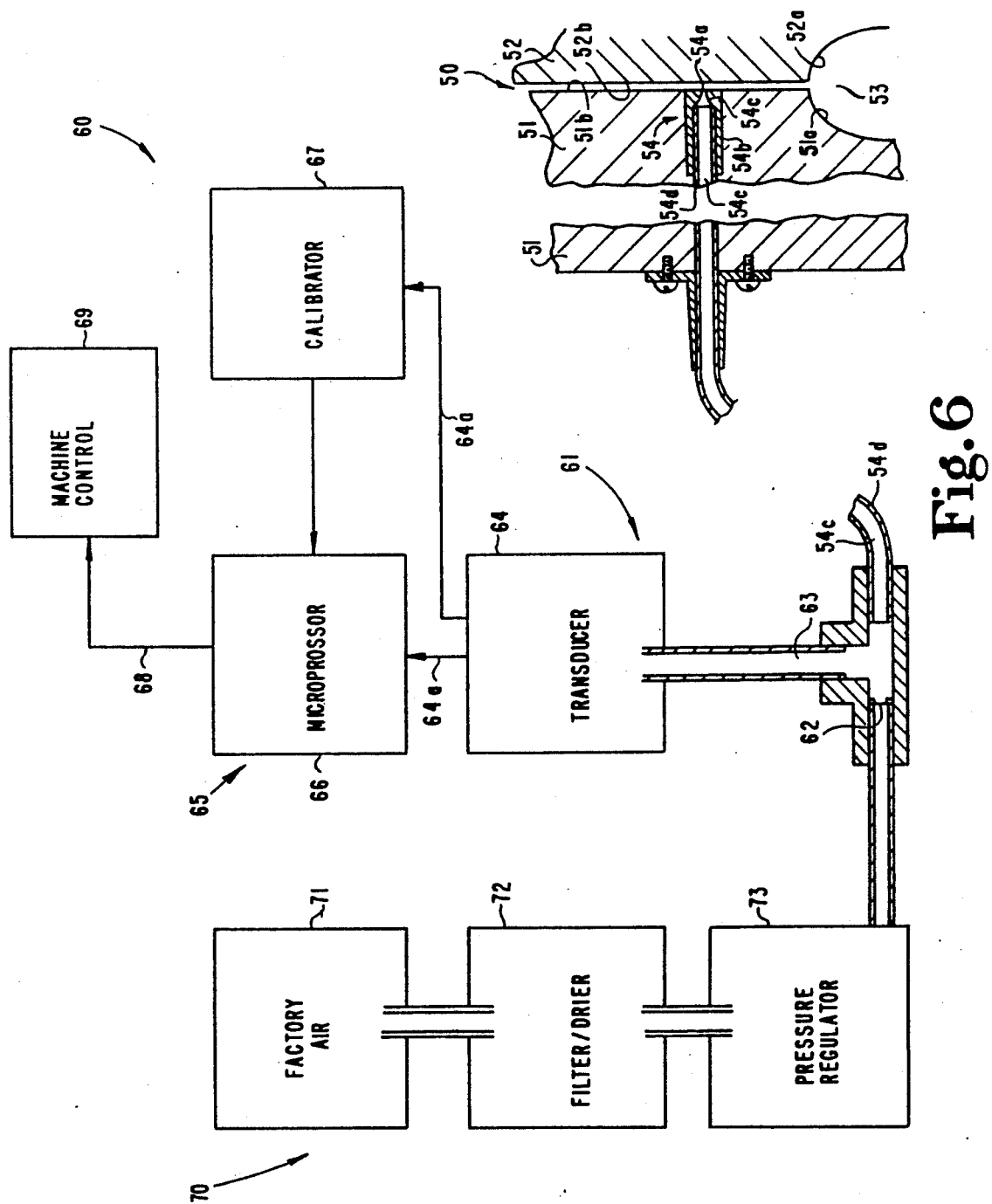
FIG. 6 is a simplified diagram illustrating elements of a preferred system of this invention.

FIG. 6 shows the relatively simple manner in which the invention can be incorporated into the elements of a molding system. As shown in FIG. 6, a molding system 50 of the invention includes at least a pair of mold elements 51 and 52 that move together to form a mold cavity 53. First mold element 51 has a first surface with a cavity-forming portion 51a and a portion 51b adjoining second mold element 52 when the cavity is closed. Second mold element 52 has a second surface with a cavity-forming portion 52a and a portion 52b adjoining the first mold element when the cavity is closed. First and second mold elements 51 and 52 are adapted to be moved together to define a closed mold cavity 53. In the invention, means 54 located at the element adjoining portion 54b of first mold element 51 is adapted to direct the flow of gas at the adjacent interfacing portion 52b of second mold element 52. As shown in FIG. 6, directing means 54 includes an orifice 54a, preferably formed by a separate orifice-forming member 54b inserted into the element abutting portion 54b of the first mold element, and a passageway 54c through first mold element 51 adapted to be connected to a source of gas, preferably compressed air. Preferably, passageway 54c is formed by flexible, temperature-resistant tubing, like Teflon tubing 54d, inserted into a passage drilled into the first mold element. Such Teflon tubing can provide a continuous passageway 54c and thermal isolation of the gas from the hot surface of the mold element. The separate, orifice-forming means, or "sensor" 54b forms an orifice 54a having a cross-sectional area smaller than that of passageway 54c. Air-directing means 54 is adapted so that orifice 54a is located closely adjacent and preferably directly at the element adjoining surface 54b of first mold element 51. If the structure and operation of mold system 50 permits, air-directing means 54 may be a separate element bolted or otherwise fastened to first mold element 51 so that air-directing means 54 is located closely adjacent or at another surface that abuts or adjoins the second mold element when the mold is closed.

FIG. 6 shows a molding system 60 of the invention including, in addition to mold 50 and air-directing means 54, means 61 for monitoring the flowing air remote from first molding surface 51b. Monitoring means 61 includes a second orifice 62 in passageway 54c leading to first orifice 54a of air-directing means 54. A transducer with first passageway 54c by a second passageway 63 to monitor the air flowing from air-directing means 54. Preferably, transducer 64 is a pressure-sensitive output device connected to sense the pressure in passageway 54c between first orifice 54c and second orifice 62 of the system. In a simple system of the invention, a pressure-sensitive output device or transducer 64 can be a direct reading pressure gauge calibrated to indicate the spacing between the first and second molding system surfaces. In more complex systems, pressure-sensitive output device 64 may be a pressure transducer of the type sold by Omega Engineering, Inc., of Stanford, Conn., under the designation PX 236. Such pressure transducers can convert the pressure in passageway 54c between the first and second orifices into an electrical voltage that is proportional to pressure.

As shown in FIG. 6, the system can further include means 65 connected with a transducer 64 to interpret the electrical signal and produce an output indicative of the spacing between first and second molding system surfaces 51b and 52b, respectively. Means 65 can include a microprocessor 66 connected with transducer 64 through an analog to digital converter. One such satisfactory microprocessor controller is sold by Cincinnati Milacron as its APC-500 Programmable Controller. As is known, such microprocessors include a central processing unit and random access memory. Means 65 can also include a calibration means 67 connected with transducer 64 to relate the output of transducer 64 to the spacing between first and second molding system surfaces 54b and 52b and to store an indicia of the spacing in the random access memory of microprocessor 66. Also stored in microprocessor 66 is an operating program to compare transducer output 64a with the indicia of spacing stored in the random access memory of microprocessor 66 and to calculate the spacing between first and second molding system surfaces 51b, 52b and produce an output 68 indicative of the spacing. Output 68 of microprocessor 66 may be used to automatically stop operations, to operate an alarm, to provide go/no-go information to the operator, and/or to drive a printer recording the spacing between surfaces 54b and 52b as a function of time or its specified times during the cycle of operation of the molding system.

System calibration means 67 may be a digital computer having the capacity of no more than, for example, an IBM PC personal computer, including a central processing unit, random access memory, and input/output devices. Such a digital computer can be provided with a calibration program for the system. Such a calibration program can sample an output 64a of the transducer specified number of times in the specified time span and generate indicia of the spacing between the first and second molding system surfaces 54b and 52b based upon a calculated mean of transducer output 64a and store such indicia in the random access memory of the microprocessor for use in the operating program of the microprocessor.

As shown in FIG. 6, a source of air 70 under pressure to provide gas to a system 60 can be factory air 71 connected with means 72 to filter and dry the air and means 73 to regulate the pressure of the air applied to the system.

In one simple embodiment of the invention, for example, means 54 is a separate, hard mold insert 54b with a diameter of about 0.5 inch (1.27 cm.) forming an orifice 54a by a fustroconical wall 54e at an angle of 45° with respect to the central axis of the insert. Orifice 54a is located at a selected surface of one mold element and has a circular cross section with a diameter of 0.147 inch (0.373 cm.) at the termination of a passageway 54c having a diameter of 0.375 inch (0.95 cm.). Mold insert 54b may be any durable metal. The remainder of a simple system can be contained within a metal box about eighteen inches (45 cm.) high, eighteen inches (45 cm.) wide, and twelve inches (30 cm.) deep. Second orifice 62 is formed by a separate durable element with a circular cross section and a diameter of 0.082 inch (0.21 cm.) in a passageway with a diameter of 0.375 inch (0.95 cm.). The monitoring means connected with the passageway 54c can include a direct reading bourdon tube static pressure gauge manufactured by the Excel company, but preferably includes a PX 236 pressure transducer sold by Omega Engineering, Inc., of Stanford, Conn. Flexible, high-temperature-resistant Teflon tubing 54d interconnects the two orifices 54a and 62 and provides passage-forming means. Where mold element 51 is hot, tubing 54d isolates the air in passageway 54c from hot mold element 51. The system can include a Model R216-02F air pressure regulator manufactured by Watts Fluid Air, Inc., of Kitlarg, Me., so that factory air of up to 80 psi. (5.6 kg/cm$^2$) can be regulated to provide a known pressure in the range of 0 psi. to 15 psi. (0 to 1 kg/cm$^2$) for application to second orifice 62. The system also includes a compressed air filter/drier which can be any such device of a reliable manufacturer The face of the static pressure gauge may be calibrated to indicate the spacing in thousandths of an inch (or cm.).

Although FIG. 6 shows the system of the invention as monitoring the position of first and second mold surfaces 54b and 52b at a single site adjacent air-directing means 54 and including a system calibration means 67, the system of the invention can be adapted to monitor the spacing of the first and second mold elements at a plurality of sites or can be modified to monitor a plurality of mold elements, each at a plurality of points.

Figure 8:
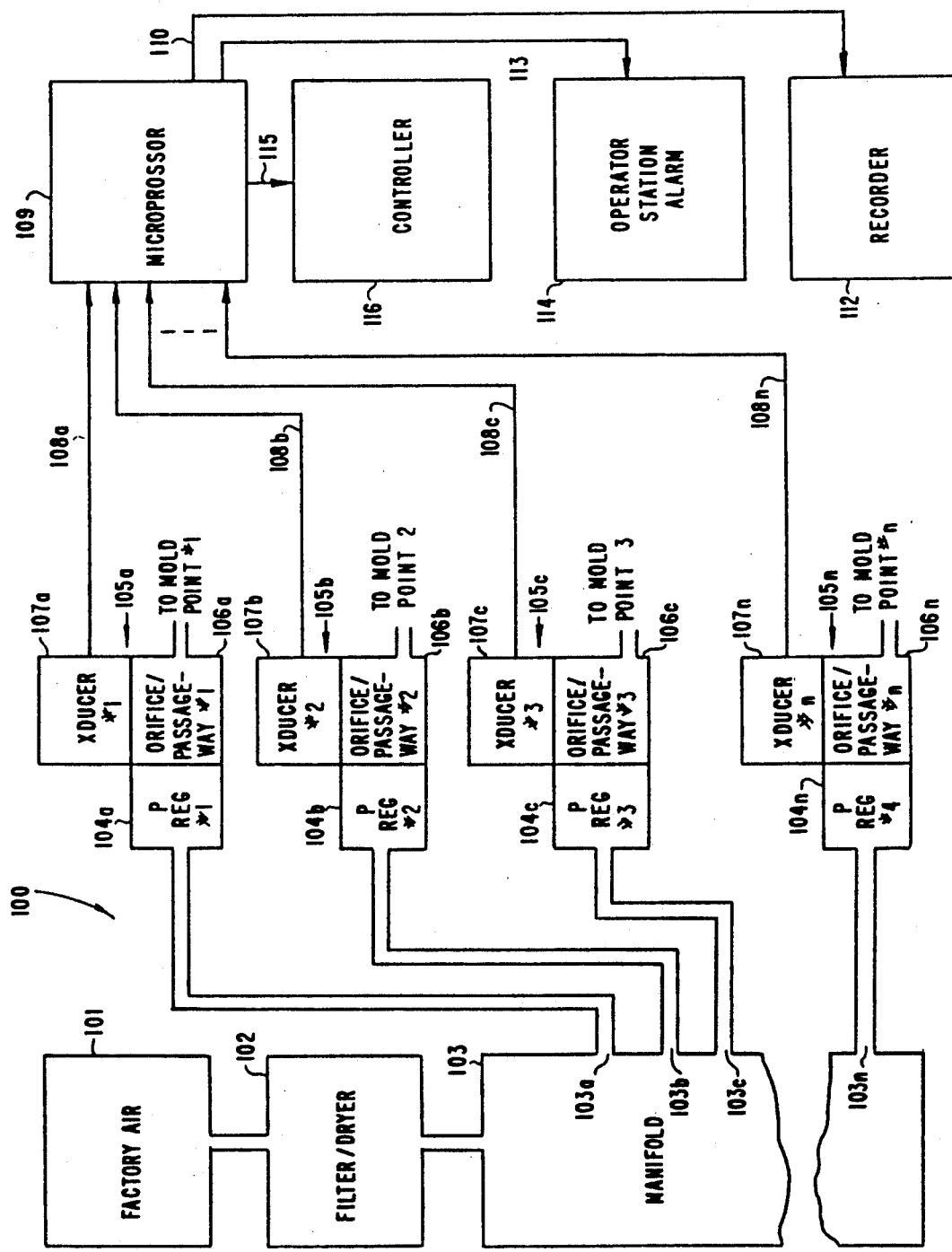
FIG. 8 is a block diagram of a more extensive system of this invention adapted to indicate the spacings at a plurality of locations in the molding system.

Such a modified system 100 is shown in FIG. 8. In such a system, factory air from a source 101 is filtered and dried by a filter dryer 102 and delivered to a manifold 103 provided with a plurality of outputs 103a, 103b, 103c, ... 103n. Each of the outputs of manifold 103a–103n delivers a flow of air to an air-directing means 54₁–54n (not shown in FIG. 8) at a different mold point as indicated in FIG. 8. The molding system, as shown in FIG. 8, includes a plurality of pressure regulators 104a–104n, each of said pressure regulators being connected between a manifold outlet 103a–103n and one of the air-directing means 54a–54n at a mold point. For example, pressure regulator 104a regulates the pressure from manifold 103 and manifold outlet 103a to the air-directing means 54₁ at mold point 1. In some systems, it may be preferable to use, instead of the plurality of pressure regulators, a single pressure regulator that is connected in the system between filter dryer 102 and manifold 103.

The system further includes a plurality of monitoring means 105a–105n. As in the system shown in FIG. 6, each of the monitoring means 105a–105n includes an orifice/passageway assembly 106a–106n and a transducer 107a–107n. The plurality of orifice/passageway members 106a–106n is connected with the plurality of air-directing means at the plurality of mold points 1–n being monitored. Each of the plurality of transducers 107a–107n monitors the flowing air at its associated one of a plurality of orifice passageway members 106a–106n and provides an output indicating the spacing between each of the mold points 1 though n and surfaces of other elements of the molding system that adjoin each of the mold points 1–n. In this system, each of the transducers 107a–107n is adapted to provide an electrical signal 108a–108n; and each of the electrical signals 108a–108n from the plurality of transducers is connected to a microprocessor 109.

In the invention, the microprocessor can be provided with an EPROM containing an operating program and calibration data, permitting microprocessor 109 to calculate the spacing between each of the mold points 1–n and the adjacent surfaces of the molding system. Microprocessor 109 can compare spacing data from the mold points 1–n to determine if the die-casting system is operating properly. The microprocessor can then provide a plurality of outputs to provide useful signals or information to the operator. For example, as shown in FIG. 8, one output 110 can be used to drive a recorder 112 to provide a permanent record of the operation of the molding system and the spacing of the mold elements of the molding system at specified times during each cycle of operation. Such permanent records can be used to provide a permanent record of the quality of the parts manufactured in the die-casting operation and can be used to identify reject parts and provide information useful in improvement of the operation. Microprocessor 109 can also provide an output 113 to operate an alarm 114 for the operator in the event of misalignment of the die elements or other malfunction determined by the microprocessor to require operator attention. Furthermore, the microprocessor can provide an output 115 to operate a controller 116 for a die-casting machine and bring the system to a stop in the event of impending damage to the molding system or the manufacture of reject parts. In addition, the controller can indicate the nature and location of the danger in the operating system.

As noted above, mold points 1–n of the system of FIG. 8 can be located on a single mold element to indicate its axial and spatial alignment during operation with its designed and correct axial and spatial alignment; and mold points 1–n can be located in the molding system to monitor the spacing and alignment of a number of movable mold elements.

Figure 9:
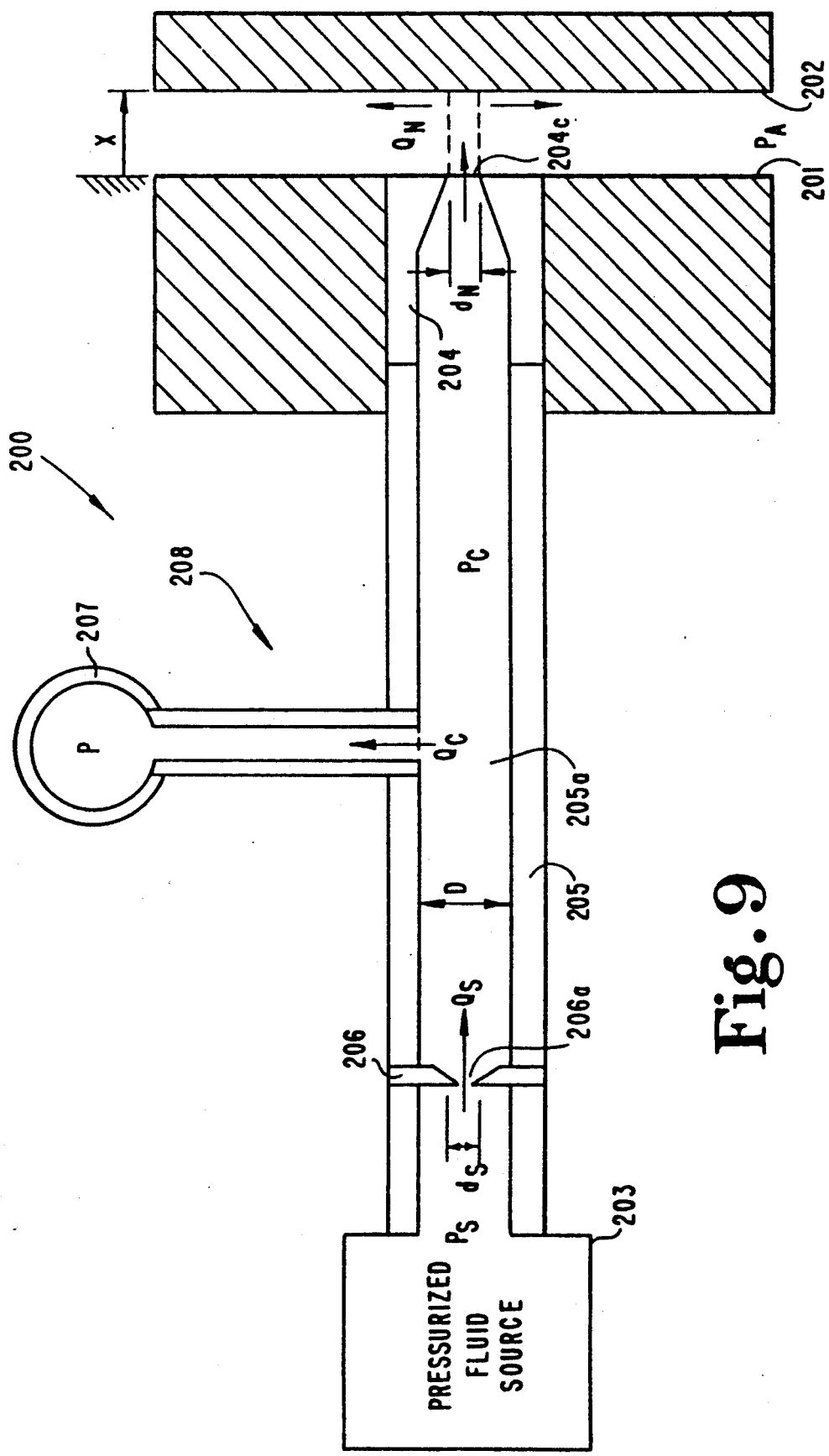
FIG. 9 is a diagrammatic view of an air-gap measuring system of this invention for purposes of illustration of the physics of the system.

FIG. 9 shows a gap-measuring system 200 in its broader aspects and the fluid conditions, generally air pressure, and flows used in the system of this invention to calculate the spacing between two surfaces. As shown in FIG. 9, in its broader aspect, the invention comprises a fluid gauge sensor system to monitor the spacing X between a first surface 201 and a second surface 202. As indicated above, surfaces 201 and 202 can be part of a die-cast molding system, but, in their broader view, can be the surfaces of die-casting or plastic molding machine, or can be the surfaces of any other machine where it is important to monitor the spacing between two moving surfaces to determine the reliable operation of the machine or to indicate impending or actual machine malfunction. In such applications, surfaces 201 and 202 may be relatively movable toward and away from one another or may move, or slide, on the planes in which they extend or may become spaced due to wear or distortion in operation.

As indicated in FIG. 9, the system includes a pressurized fluid source 203, providing fluid at a known pressure $P_s$ and a fluid outlet 204 at first surface 201. This system also includes a fluid line 205 forming a passageway 205a and coupling pressurized fluid source 203 to fluid outlet 204 for directing the fluid through outlet 204 from first surface 201. The system further includes means 208 for monitoring the fluid in fluid line 205 for a change in fluid conditions, indicating the spacing between first and second surfaces 201 and 202, respectively. Monitoring means 208 includes a second orifice means 206 forming an orifice 206a and a pressure-sensitive output device 207 communicating with the fluid line 205 to check the pressure $P_c$ in a fluid line 205.

Figure 7:
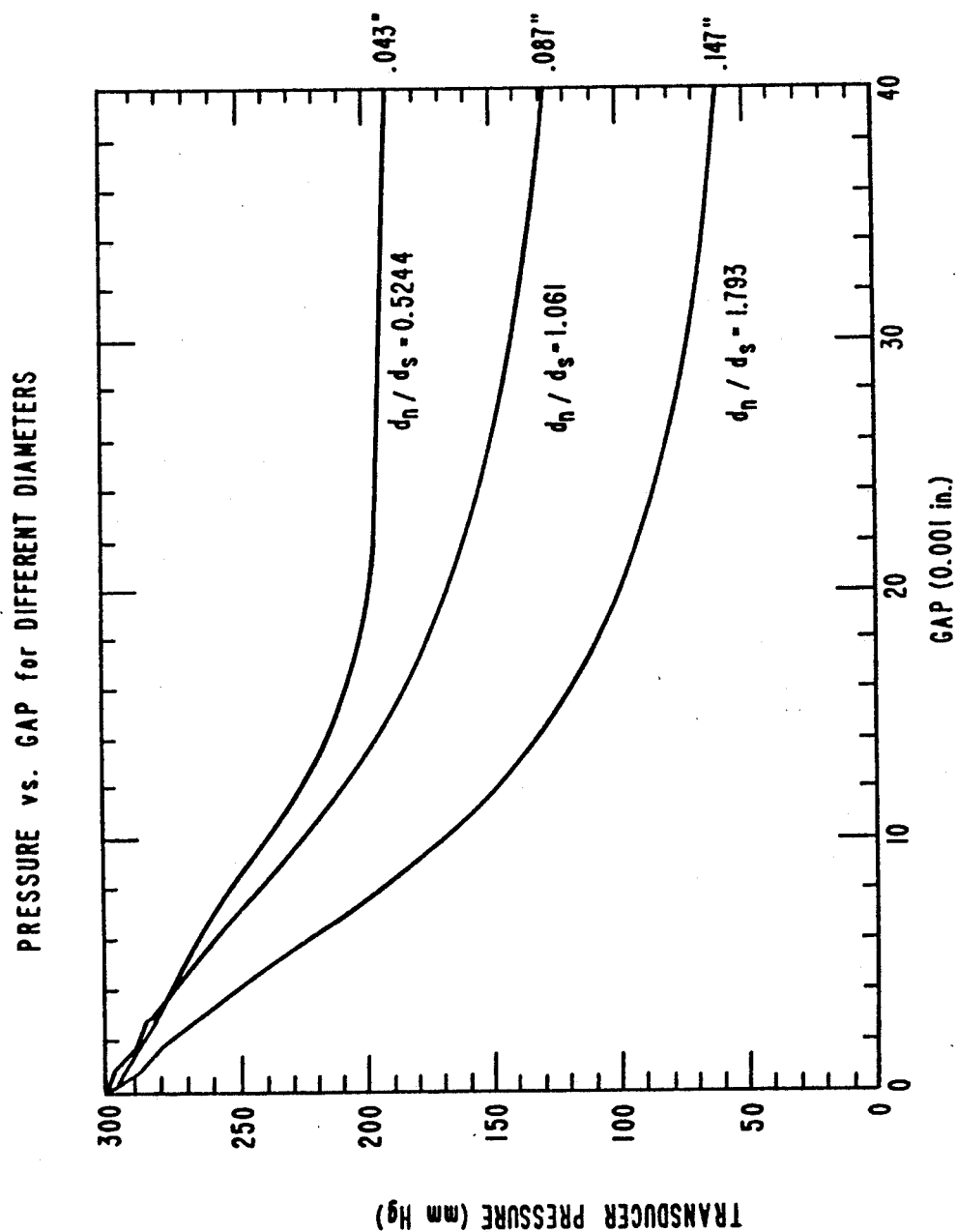
FIG. 7 is a graph showing an example of system air pressure vs gap spacing for several ratios of system orifice diameters.

The system of this invention, as indicated by FIG. 9, relies on the physical phenomena that when an air jet from a nozzle 204 impinges on a surface 202 close to a nozzle exit 204c, the pressure $P_c$ on the upstream side of nozzle 204 depends on the distance x between the nozzle exit and the neighboring surface 202. The ratio of the diameter $d_N$ of nozzle orifice 204c to the diameter $d_s$ of second orifice 206a is important because larger ratios $d_N/d_s$ provide a greater variation in pressure $P_c$ in passageway 205a with gap spacing x, as shown in FIG. 7. Pressure $P_c$ is sensed by a pressure output device or transducer 207 and used to provide a useful output for a gap-measuring system 200. It is important, however, to keep the sizes of orifices 204c and 206a small to conserve the fluid used in operation of the system.

This system has been found to be particularly advantageous in the determining of clearances between surfaces which are so configured, or which are in such an environment, that direct measurement by standard means is either inconvenient, impossible, or dangerous. In such applications, a nozzle can be installed in one of the surfaces and supplied with fluid from an external source without interfering with the relative motion of the surfaces. The pressure then can be measured at a convenient remote point in the fluid line upstream of the nozzle. As set forth below, this measured pressure can be converted to a measurement of the gap x.

In practical applications of the invention, air, at a known regulated supply pressure $P_s$, is directed through orifice 206a having a diameter $d_s$ at a flow rate of $Q_s$. The air passes through a fluid line 205, which, in practice, is a tube of diameter D, to a nozzle 204, the exit plane of which is flush with one of surfaces 201. Nozzle exit orifice 204c has a diameter $d_N$. The air $Q_N$ exiting from nozzle 204 in a jet which impinges on second surface 202 and then expands through the gap x between the surfaces to atmospheric pressure $P_A$. The distance between the surfaces is called the air gap and is denoted by x. The pressure in chamber or passageway 205a formed by fluid line 205 between orifice 206a and nozzle orifice 204c is assumed to be uniform and have the value $P_c$. A pressure-sensitive output device, or transducer 207, is installed to sense the pressure in a line 205 between a orifice 206 and nozzle 204 and indicates a pressure P. Under transient conditions, there may be a flow $Q_c$ between chamber 205a and transducer 207; but such transient flow may be neglected in many operations of the system.

For steady flow, the flow rate $Q_c$ to transducer 207 is zero and the pressure at transducer 207 is the same as that in chamber 205a between orifice 206a and nozzle 204; the flow rate through orifice 206 is the same as the flow rate through nozzle 204.

$$P_c = P \text{ and } Q_s = Q_N \qquad (1)$$

Conventional orifice equations can be used to express the relation between the flow rate through a restriction and the pressure drop across the restriction for both orifice 206a and nozzle orifice 204c.

$$Q_s = A_s \cdot C_s \cdot [2 \cdot (P_s - P)/Y_s]^{\frac{1}{2}}$$

$$Q_N = A_N \cdot C_N \cdot [2 \cdot (P - P_A)/Y_N]^{\frac{1}{2}} \qquad (2)$$

In these equations $Y_s$ and $Y_N$ represent the density of the air at orifice 206a and at nozzle orifice 204c. The air density at orifice 206a may be different from the density at nozzle orifice 204c due to a temperature difference between these locations. In the invention, line 205 can desirably isolate the air in passageway 205a from any high temperature surfaces of element-forming surface 201. $A_s$ and $A_N$ are characteristic areas at orifice 206a and nozzle orifice 204c and are taken to be:

$$A_s \pi \cdot d_s^2/4 \text{ and } A_N = \pi \cdot d_N \cdot x \qquad (3)$$

The parameters $C_s$ and $C_N$, called flow coefficients, account generally for the geometry of the restriction, the roughness of the flow passage in the restriction, and the flow rate and fluid properties. The geometry is often integrated into the flow coefficient through the nondimensional obstruction parameter $$\beta = d/D \qquad (4.1)$$

The roughness $\epsilon$ is also normally incorporated in nondimensional form through the parameter $$\epsilon/d \qquad (4.2)$$

The effect of flow rate and the fluid properties can be described through the nondimensional parameter $$Re = (4 \cdot Q)/(\pi \cdot d \cdot \sigma) \qquad (4.3)$$

where $\sigma$ is the kinematic viscosity. Re is called the Reynolds number. While all three of these nondimensional parameters are temperature dependent through changes due to thermal expansion, the Reynolds number is much more sensitive to temperature changes because of the temperature dependence of viscosity.

Substituting Eqn (2) into the second of Eqn (1) and dividing by $2^{\frac{1}{2}}$, we have:

$$A_s \cdot C_s \cdot [(P_s - P)/Y_s]^{\frac{1}{2}} = A_N \cdot C_N \cdot [(P - P_A)/Y_N]^{\frac{1}{2}} \qquad (5)$$

The equation can be converted to gauge pressure letting:

$$P - P_A \rightarrow P \text{ and } P_s - P_A \rightarrow P_s$$

Next, divide both sides of Eqn (5) by $P_s$ to obtain:

$$A_s \cdot C_s \cdot [1 - P/P_s)/Y_s]^{1/2} = A_N \cdot C_N \cdot [(P/P_s)/Y_N]^{\frac{1}{2}} \qquad (6)$$

For convenience, two nondimensional parameters can be defined:

$$L = (C_N/C_s) \cdot (Y_s/Y_N)^{\frac{1}{2}} \text{ and } y = P/P_s \qquad (7)$$

Then, Eqn (6) can be written as:

$$L \cdot A_N/A_s = [(1-y)/y]^{\frac{1}{2}} \qquad (8)$$

But, from Eqn (3):

$$A_N/A_s = (\pi \cdot d_N \cdot x)/(\pi \cdot d_s^2/4 = 4d_N \cdot x/d_s^2 = a \cdot z, \text{ where}$$

$$a = 4d_N^2/d_s^2 \text{ and } z = x/d_N \qquad (9)$$

Note that z is a nondimensional air gap. Now Eqn (8) takes the form:

$$a \cdot L \cdot z = [(1-y)/y]^{\frac{1}{2}} \qquad (10)$$

Eqn (10), Eqns (7) and (9) express the basic physics of the system of this invention in nondimensional terms. The advantage of this approach is that the phenomena which are ultimately determined empirically are isolated in the factor L. Moreover, the quantities by which these phenomena are expressed are grouped in a small number of nondimensional parameters, $Y_s/Y_N, \beta, \epsilon/d$ and Re.

In the calibration procedure of this invention, the characteristic geometrical parameters, $d_s$ and $d_N$, are known and fixed. The parameter $a$ can them be calculated from Eqn (9). Similarly, the supply pressure $P_s$ is known and regulated. The calibration will provide an empirical relation between the parameter L and the nondimensional chamber pressure y. Then for a given (measured) value of the chamber pressure P, the air gap x can be calculated as follows:

1. Calculate $y = P/P_s$.
2. Evaluate L for this value of y from the empirical relation.
3. Calculate z from Eqn (10), i.e., $z = [(1-y)/y]^{\frac{1}{2}}/(a \cdot L)$.
4. Finally, calculate the air gap from Eqn (9), i.e., $x = z \cdot d_N$.

In order to determine the empirical relation between L and y, both the air gap x and the chamber pressure pressure P are accurately measured for a number of conditions encompassing the normal range of operation for the system. In practice, only six or seven calibration points in the range from fully closed (x=0) to some large value of the air gap ($x = X_{max}$) may be necessary. The actual value of $X_{max}$ used in the calibration depends on the values of $d_s$, $d_N$ and $P_s$.

In calibrating the system of this invention, pressure transducer output P and air gap x are measured at the plurality of system spacings (e.g., six to seven spacings); and the results are stored in the random access memory of a system calibrating means, such as a digital computer, as set forth below:

| Calibration Point (i) | Digitized Chamber Pressure P | Air Gap x |
|---|---|---|
| 1 | $P_1$ | $x_1$ |
| 2 | $P_2$ | $x_2$ |
| 3 | $P_3$ | $x_3$ |
| . | . | . |
| . | . | . |
| n − 1 | $P_{n-1}$ | $x_{n-1}$ |
| n | $P_n$ | $x_n$ |

The digital computer is provided with a system calibration program to calculate from the values of P and x in this table and the known geometrical parameters and supply pressure, the nondimensional parameters y, a, z, and the L from Eqns (7), (9), and (10), i.e., $Y=P/P_s$; $z=x/d_N$; and $L=[[(1-y)/y]^{\frac{1}{2}}]/(a\cdot z)$.

The raw data in the previous table is thus converted by the system calibration means to:

| Calibration Point (i) | Nondimensional Chamber Pressure Y | Non- dimensional Air Gap z | Nondimensional Flow Parameter L |
|---|---|---|---|
| 1 | $y_1$ | $z_1$ | $L_1$ |
| 2 | $y_2$ | $z_2$ | $L_2$ |
| 3 | $y_3$ | $z_3$ | $L_3$ |
| . | . | . | . |
| . | . | . | . |
| n − 1 | $y_{n-1}$ | $z_{n-1}$ | $L_{n-1}$ |
| n | $y_n$ | $z_n$ | $L_n$ |

Figure 10:
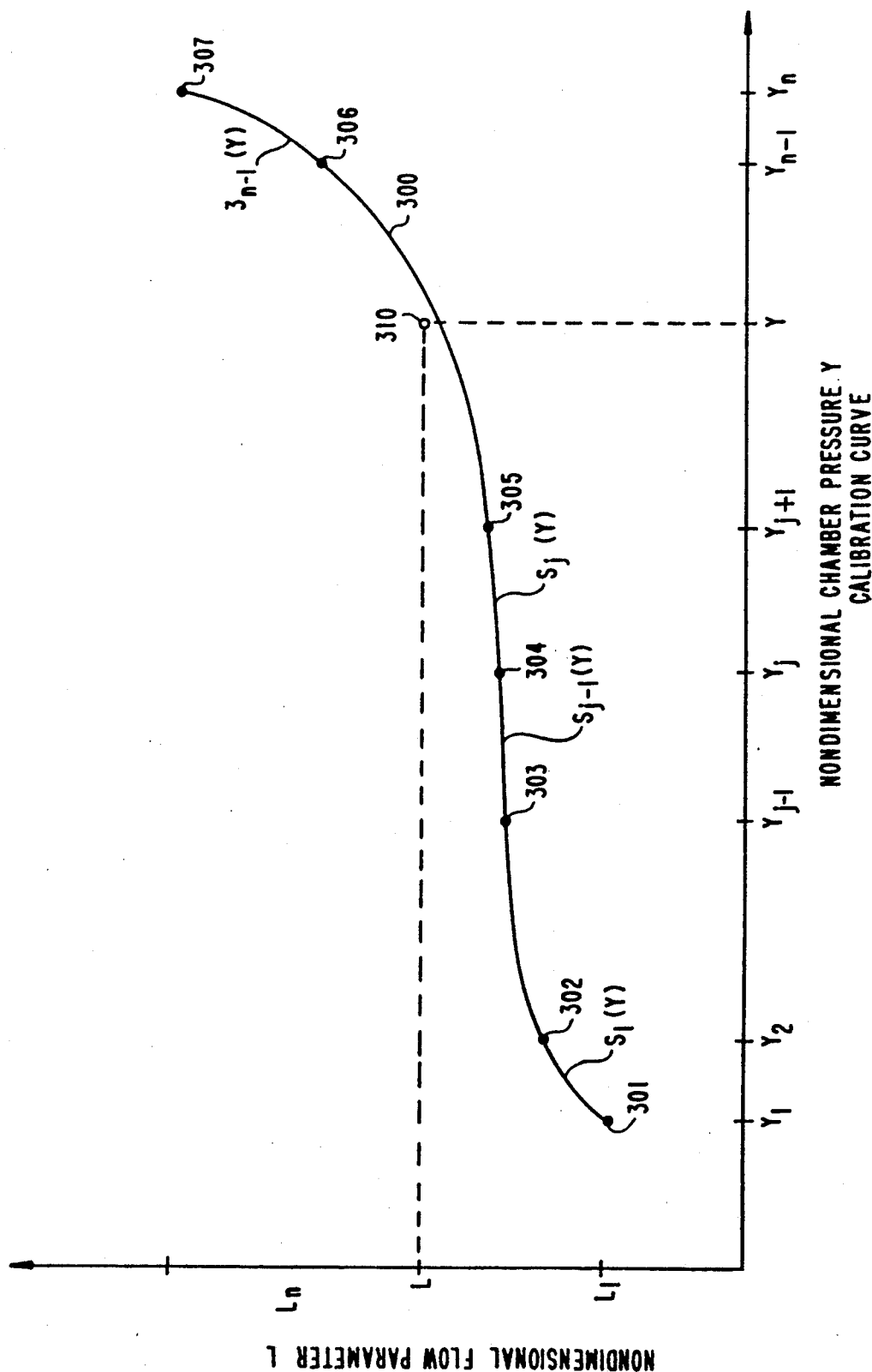
FIG. 10 is a typical calibration curve for the air gap-measuring system of FIG. 9.

FIG. 10 shows a typical calibration curve 300 for a system of this invention. Solid circles 301–307 represent measured calibration points corresponding to $L_1$-$L_n$ and $y_1$-$y_n$ of the table above. The open circle 310 represents an evaluation of the nondimensional flow parameter L for a given measured value of the nondimensional chamber pressure y for a spacing x (FIG. 9) between two surfaces 201 and 202 (FIG. 9).

The calibration program generates, for storage in a microprocessor (like 66 of FIG. 6) by an interpolation procedure such as the cubic splines procedure, a large table of pressure transducer outputs $P_{1-M}$, including interpolated values between the measured values, for air gaps x throughout the range $x_{max}$ to zero. The operating program of a microprocessor uses this calibration table giving the relation between the (dimensional) pressure transducer output P and the (dimensional) air gap x for the known geometrical parameters and supply pressure. If the number M of subdivisions of P is large enough (e.g., M=100), linear interpolation in the stored table is satisfactory. If, however, the number M of subdivisions of P is on the order of ten or less, interpolation requires calculation and storage of the dimensionless parameters y, z, and L, as set forth above, and interpolation in the stored dimensionless parameter data using an interpolation procedure like the cubic splines procedure. The decision of using a calibration program to provide a large table of P v x data in the system microprocessor, or providing the system microprocessor with an interpolation program depends upon the microprocessor storage capacity and operating speed.

In the dynamic operation of a die-casting system with a plurality of fluid outlets 204c, variations in the length of passageways 205a can cause delays in the pressure changes in the passageways 205a and in the outputs of their respective pressure-sensitive output devices 207. Such variations can provide errors in an immediate comparison of the outputs of the plurality of fluid outlets where the surfaces being monitored move rapidly. Compensation for such variations in length can be made by measurement and calibration if necessary.

Figure 11:
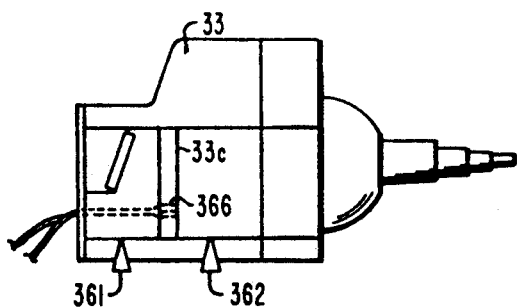
FIG. 11 is a side view of the upper slide of the molding system of FIG. 13 indicating by arrow heads the location of air flows directed from the movable carrier to detect improper alignment and movement of the vertical slide and the location of air-directing outlets to detect improper closure of the slide.
Figure 12:
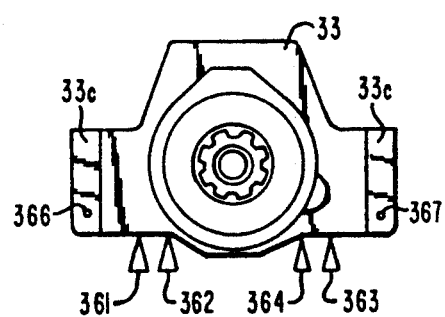
FIG. 12 is an end view of the vertical slide of FIG. 11 further showing, by arrow heads, the location of directed air flows in the system of the invention to determine the improper movement and alignment of the vertical slide and the location of air-directing outlets to detect improper closure of the slide.
Figure 13:
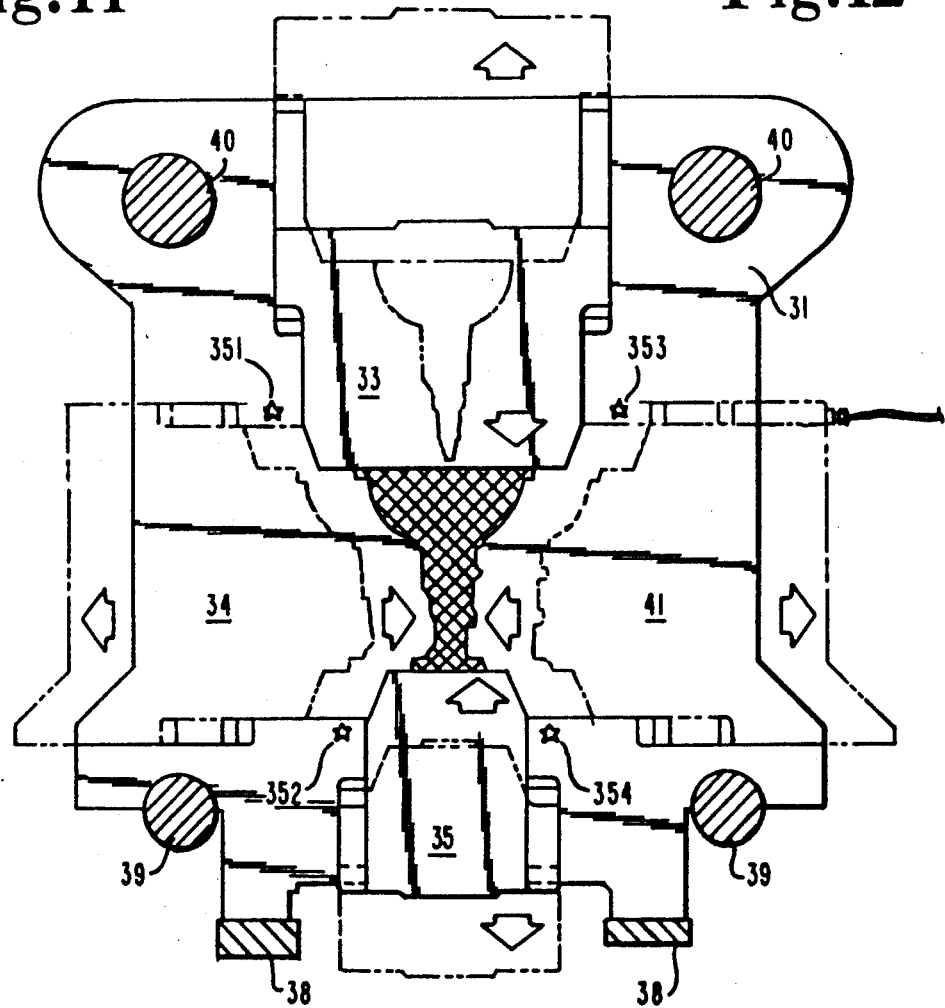
FIG. 13 is a cross-sectional view of the molding system of FIGS. 2A and 2B (corresponding to FIG. 3), illustrating by stars the portions of the movable carriage of the mold system whose spacings can be detected by directed air flows from a plurality of sites on the stationary mold element to detect the failure of the system to fully close or to close in such a manner that the mold has a partially open portion.

FIGS. 11–13 demonstrate how the system of the invention can be incorporated into a molding system including a movable die member having a plurality of movable surface portions and a stationary die member having a plurality of stationary surface portions aligned with the plurality of movable surface portions of the movable die member. For convenience, FIGS. 11–13 illustrates the molding system discussed and illustrated above in FIGS. 2–4. The mold element numbers included in FIG. 13 correspond to the molding die elements of FIGS. 2–4, specifically as shown in FIG. 3. FIG. 13, however, illustrates by a plurality of stars 351, 352, 353, and 354 sites for the location of the fluid-gauging system of this invention. With the fluid-gauging system directing flows of air from air-directing means located in die element 36 (FIG. 2A) and monitoring the conditions of the air flows to determine the spacing of the sites 351, 352, 353, and 354 on die element 31 from corresponding sites on the mold-closing surface of die element 36, information on spacings between the surface of die element 31 and the corresponding mold-closing surface of die element 36 at each of the sites 351, 352, 353, and 354 can be obtained. This spacing data can verify that the surfaces of die elements 31 and 36 are parallel prior to their closing and the imposition of the high forces by the die-casting machine. The continuous monitoring by the fluid-gauging system at sites 351, 352, 353, and 354 can also detect if the imposition of high liquid metal pressure in the mold cavity results in moving the mold-closing surfaces of die elements 31 and 36 apart. Continuous recordation of data on spacing at sites 351–354 can also provide an assurance of the quality of the parts manufactured by die-casting mold system 30 while providing a record that molding system 30 was properly closed throughout its operation.

FIGS. 11 and 12 are a side view and end view, respectively, of top slide 33 of the molding system of FIGS. 2–4 and 13. FIGS. 11 and 12 show by arrows 361–364 sites or locations of the imposition of air from air-directing means located in carrier die element 31 against sliding surfaces of the vertical slide 33 to monitor verticality of movement and position of vertical slide 33 throughout the die-casting cycle. Vertical slide 33 can also be provided with air-directing means 366 and 367 in stops 33c on each side of the vertical slide. As noted above and as shown in FIG. 4B, stops 33c of vertical slide 33 are pressed against stops 31b of carrier 31 when mold 30 is closed. Air-directing means 366 and 367 can thus assure that slide 33 is properly closed by the mold system and maintained in proper position throughout the die-casting cycle. As apparent from examination of FIGS. 2A, 2B, 11, and 12, if vertical slide 33 is or becomes misaligned or moves in an unintended manner, such misalignment can be determined from a variation in the spacings determined by the fluid-gauging means monitoring sites 361–364 and from fluid-gauging means including air-directing means 366 and 367.

Each die system with its movable parts and slides presents different opportunities for malfunction and misalignment of the die elements during installation and operation and because of wear over a period of time. Experienced designers of die-casting molds can, through their experience, determine where to locate the fluid-gauging systems of this invention in the molding system to best monitor the proper operation of the molding system and prevent its damage in use. The air-directing means, or sensors, of the system are, of course, generally located at adjoining interfacing surfaces of cavity-forming die elements that establish the position of the die elements. Such adjoining interfacing surfaces are frequently in the stop-forming surfaces of the die elements, including the slides. The stop-forming surfaces may be separate, hard steel die inserts, as described above, which carry the air-directing means. The air-directing means may also be located in surfaces of die elements surrounding the cavity-forming surfaces of the die elements. In addition, the air-directing means may be located at adjoining sliding surfaces of the die where wear is anticipated to monitor the wear as the die is used. Although it is not necessary for operation of the system, it is preferred that the lengths and diameters of the passageways between the air-directing means of a mold or die and the monitoring means or pressure output devices be substantially equal to provide substantially equal transient responses to spacing or gap changes sensed by each of the air-directing means and to avoid compensation for any differing transient responses.

Thus, in the operation of the system of this invention, gas, preferably air, at a known and regulated pressure is directed from a fluid outlet at a first surface and generally toward an adjoining interfacing second surface which is movable with respect to the first surface. The conditions of flowing gas upstream of the fluid outlet are monitored to indicate the spacing between the first and second surfaces, and changes in conditions in the flowing air are used to generate outputs or signals when the fluid conditions indicate an undesirable spacing or change of spacing between the first and second surfaces or to provide an output or record of the spacing between the first and second surfaces. In die-casting operations in which mold elements are moved to form a mold cavity, the invention provides an improvement in directing a flow of air from a surface of one of the mold elements at an adjoining interfacing surface of second adjacent mold element and monitoring the pressure of the air in a passageway leading to the air-directing means of the first mold element by a pressure-sensitive transducer to produce an electrical signal output, indicating the spacing between the adjoining interfacing surfaces of the mold elements. The monitored pressure and supply pressure are used to recover from microprocessor storage, data from which the spacings between adjoining interfacing surfaces of the mold elements may be calculated.

A preferred system of the invention includes a computer having the capability of an IBM PC personal computer or any similar or superior computer. The computer is preferably provided with a cathode-ray tube and printer output, one or more disk drive systems, and a keyboard input. The computer should have at least 256 kilobytes of random access memory, and the disk-operating system should have the capability of at least MS-DOS Version 2.1. With such a computer, the central-processing unit can be provided with any convenient disk-operating system, such as MS-DOS, and the calibration and operating programs of the system of this invention can be provided on floppy disks compatible with the operating system of the computer and the disk-operating system. More preferably, the system of the invention includes a data-processing system dedicated to the invention, including 16-bit central-processing units or microprocessors having high operating speeds and the capability of rapid data recovery and computation, random access memory means capable of storing data generated from a plurality of pressure readings taken over short intervals of time from a plurality of pressure transducers. In more complex systems of this invention, the number of pressure transducers may be as high as sixty-four and the system may take and store as many as ten readings of pressure from each transducer in each second to average out small variations in pressure due to perturbations, mechanical vibrations, and "whistling". In such systems, the available random access memory may exceed 512 Kbytes. The preferred data-processing portion of this invention can, therefore, be placed in module form on printed circuit boards and housed within an integrated structure and housing that also incorporates a cathode-ray tube, which may have color capability, one or more disk drives, a keyboard, and a printer.

Figure 14A:
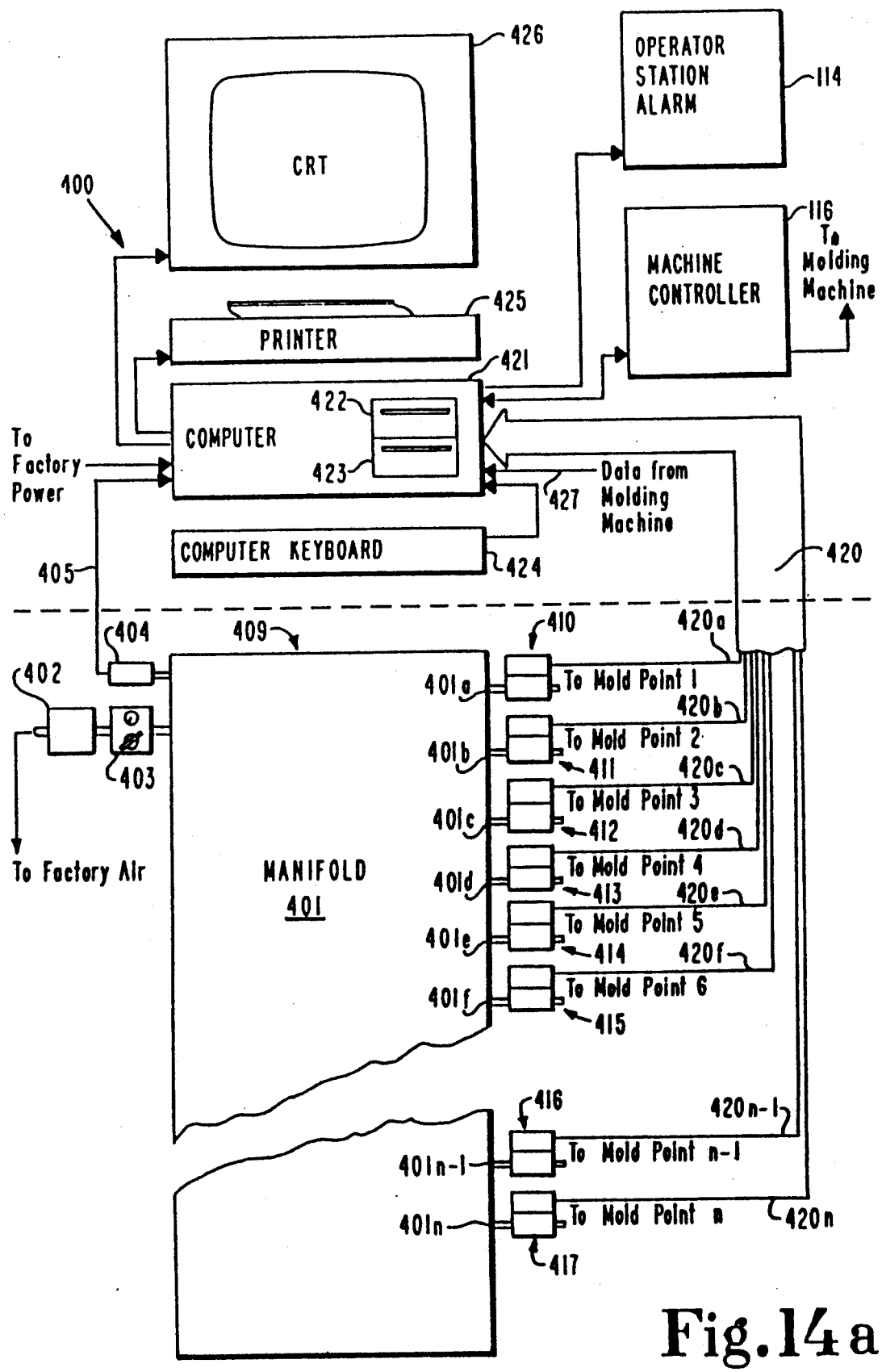
FIG. 14A is a diagrammatic drawing of a preferred apparatus of this invention adapted to indicate the spacings at a plurality of locations in the molding system.

FIG. 14A is a diagrammatic view of a preferred apparatus 400 of this invention. All of the elements shown on FIG. 14A, except operator alarm 114 and machine controller 116, can be assembled into one or more integrated units adapted for connection to sources of electrical power and of compressed air at a factory. If necessary, the units may be isolated from the factory electrical power system by an appropriately shielded and filtered, constant voltage transformer or system.

In the preferred embodiment of such apparatus, the data-processing system comprising computer 421, disk drives 422, 423, computer keyboard 424, printer 425 and cathode-ray tube display 426 are assembled in a steel enclosure (not shown) having one or more closable access doors to permit the data-processing system to be located adjacent a molding machine and to be protected from the adjacent factory environment. A separate assembly 409 (not shown) can preferably encompass a manifold 401, an air filter and drier 402, an adjustable pressure regulator 403, a pressure transducer 404, and a plurality of monitoring means 410–417. Manifold 401 should be as small as possible manufactured in accordance with the ASME boiler and pressure-vessel code, having sufficient volume to permit as many as sixty-four, but, more preferably, thirty-two pressure-sensing systems of the invention to be supplied and isolated from the factory air pressure to which manifold 401 is connected. A box-like manifold having dimensions of about 2.5 inches (6.5 cm.), about 8 inches (20.5 cm.), and about 14 inches (35.5 cm.) has been found satisfactory for supplying thirty-two pressure-sensing systems. Manifold 401 is adapted, as shown in FIG. 14A for connection to factory air through an air filter and dryer 402 and an adjustable pressure regulator 403 capable of maintaining substantially constant pressure in the face of variations of factory air pressure and variations in the volume of air that may be used in the operation of the system with a plurality of air orifices.

In the preferred apparatus of this invention, a pressure transducer 404 measures the supply pressure within the manifold and provides a measure of the supply pressure to the data-processing system as shown in FIG. 14A. Manifold 401 may also be provided with a plurality of threaded outputs 401a–401n which may be used to support a plurality of monitoring means 410–417. Each of monitoring means 410–417 includes an equal restriction, or orifice, and a pressure transducer, for each of the pluralities of sensors or air orifices (in a like manner as monitoring means 61 of FIG. 6). The preferred apparatus of the invention can thus be adapted for use with molding systems of varied complexity by threading into outputs 401a–401n of the manifold as needed, a plurality of monitoring means modules 410–417 which preferably include the same known restriction, e.g., 0.082 inch (0.21 cm.) diameter orifice, and a pressure transducer such as the Omega Engineering, Inc., PX236 pressure transducer fitting. Unused threaded orifices of the manifold can be provided with pipe plugs to close the outlets.

Separate assembly 409 is preferably mounted on and carried by the movable platen of the molding machine. By mounting separate assembly 409 on the movable platen of the molding machine, the passage-forming means between monitoring means 410–417 can be shortened, more easily made uniform in length, and protected against flexure in operation, thereby improving the response time of the system and its reliability. Furthermore, providing separate assembly 409 provides the apparatus of the invention in modules that provide improved reliability, servicing, and maintainability of the system.

As shown in FIG. 14A, each of the pressure transducers of the plurality of monitoring means 410–417 can be connected at, for example, 420a–420n, with a cable 420 which runs from separate assembly 409 to data-processing system 421. Data-processing system 421 may include one or more disk drives 422 and 423 and be connected with a keyboard input 424 and a printer 425 and a cathode-ray tube output 426. The data-processing system may also be provided, if desired, with one or more inputs 427 from the molding machine. Connections between the passage-forming means or tubing between monitoring means modules 410–417 and the orifice-forming sensors at mold points 1–n can, of course, be provided at the outside of the housing to provide an attractive and conveniently used system.

The program to operate the data-processing system is preferably in a high order language such as Turbo Pascal 4.0 which can provide fast data processing and a high quality display on the cathode-ray output. In a preferred system of this invention, the operating program for the central-processing unit of computer 421 may be stored in an internal ROM or EPROM, and generate, upon system start-up, an initial menu.

In the operation of the preferred system of the invention, the central-processing unit is programmed to "read" the supply air pressure and the air pressures present at the connected orifice-forming sensors at a sufficient number of intervals to provide reliable average values. The central-processing unit is programmed to use dimensionless parameters to minimize errors due to air pressure fluctuations and can combine such empirical flow coefficient variables of the system as air density, kinematic viscosity and Reynolds number, and passage roughness and obstruction parameters into a dimensionless parameter that can be reliably determined by calibration. The central-processing unit is further programmed to calculate, from the data on system, the known air pressure of the manifold and the measured air pressure present at each of the orifice-forming sensors, the displacement of the sensor from its intended position in a mold, and can use, if needed, stored calibration data on the empirical flow coefficient.

In a preferred embodiment, the initial menu advises the operator to hit "ENTER" to begin normal operation. The menu also includes a selection for calibration program, but advises the equipment operator to enter a coded control sequence before the program exits to the disk-operating system to allow for calibration of the system. A flow chart of a data-processing computer program 500 for a system of the invention is shown on FIG. 14B.

Figure 14B:
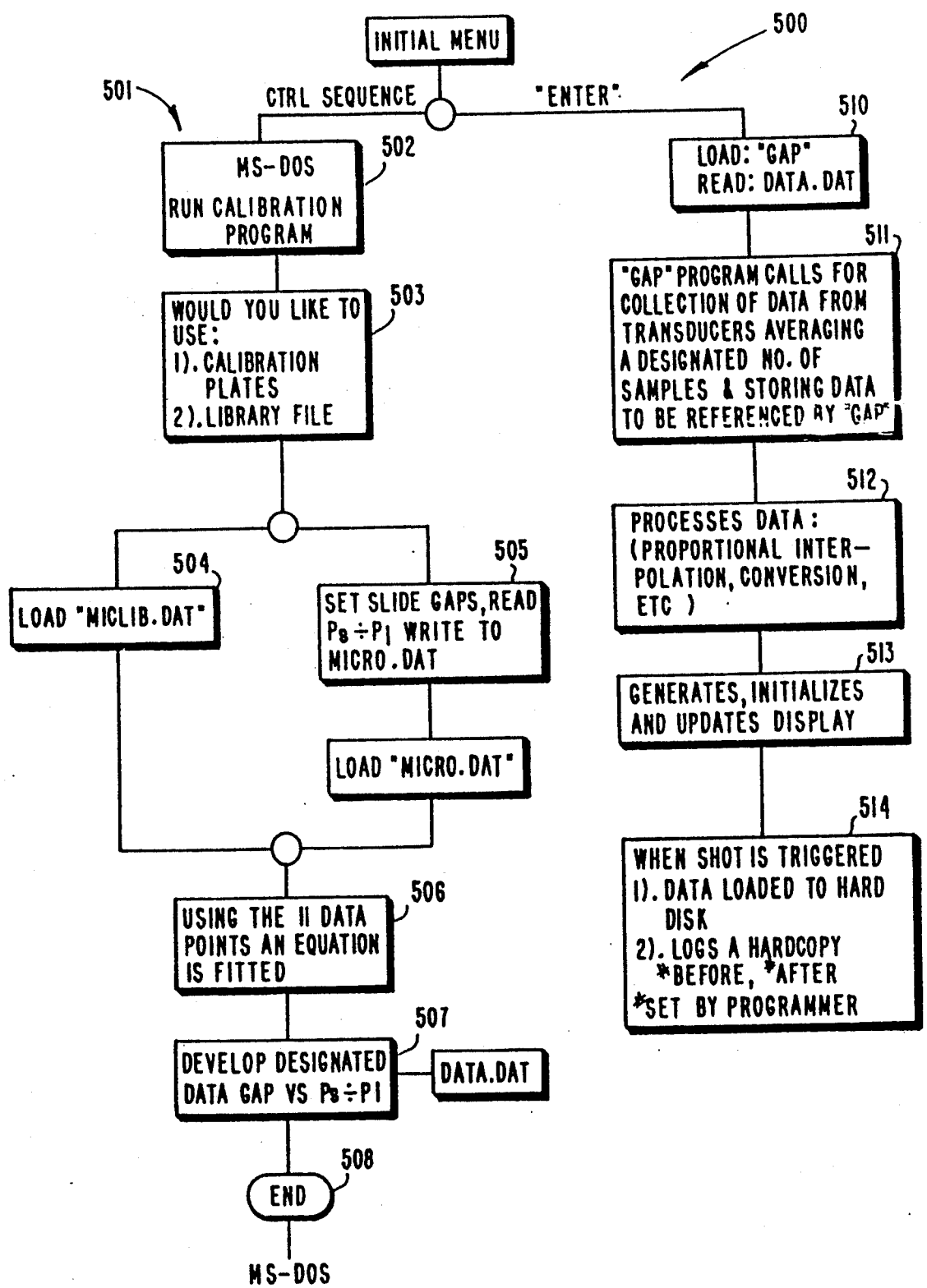
FIG. 14B is a flowchart for the operating program of a preferred system of this invention.

As shown on the flow chart of FIG. 14B, if a calibration program 501 is selected, the central-processing unit of computer 421 exits to the disk-operating system, preferably MS-DOS, and advises the operator to insert the calibration disk and calibration data into the data-processing system. As indicated above, preferably the data-processing system is provided with a disk drive system or systems 422, 423 for "floppy" disk media.

Upon insertion of a floppy disk including the calibration program and data and entry of a "RUN" signal for a calibration program (502), the calibration program preferably generates a menu asking the operator if he would like to use calibration plates or a library file (503). If the operator selects data from the library file, the calibration system loads the appropriate memory of the data-processing system with "MICLIB.DAT" data which is data resulting from a prior calibration applicable to operation of the system in use (504).

If the operator selects calibration from calibration plates, the calibration program generates a plurality of menus on cathode-ray tube 426 advising the equipment operator to attach a gap calibrator to a selected one of the connections to monitoring means 410–417 of apparatus 400. The calibration device includes a length of hose, or an analog thereof, and a vice-like device including, in one stationary surface of the vice, an orifice-forming sensor having a calibrated air orifice corresponding to those of the mold in use and, in the other movable surface of the vice, a solid opposing face. The vice-like calibration device permits a plurality of plates having different precise measured thicknesses to be inserted between the surface with the orifice-forming sensor and the opposed solid surface to provide a plurality of known spacings and air gaps therebetween. For each such known air gap and spacing, computer 421 measures the output of the transducer of the attached monitoring means (one of 410–417) and the output of the supply pressure transducer 404, computes the dimensionless quantity $P_s/P_i$ and stores the dimensionless parameter $P_s/P_i$ and the corresponding air gap x in the RAM memory computer 421. Upon completion of the storage of such data for one spacing, the calibration program advises the equipment operator to change the air gap plate to obtain further calibration data and repeats the steps set forth above for the next calibration point. This calibration procedure continues through a plurality of calibration points (505). In preferable systems, it has been found that eleven calibration spacings provide adequate data for accurate measurement with the system over a gap spacing of from 0 to 0.070 of an inch (0.178 cm.); but, of course, more or less calibration spacings may be used.

The collected data is stored in a file identified, for example, as "MICRO.DAT". Upon completion of the "MICRO.DAT" file, the calibration program loads the "MICRO.DAT" file data into a program for curve-fitting for interpolation and calculates an equation that corresponds to the data, using a least squares approximation and, preferably, a seventh order polynomial of the form $$x = C_7 p^7 + C_6 p^6 + C_5 p^5 + C_4 p^4 + C_3 p^3 + C_2 p^2 + C_1 p C_0 \quad (11)$$

where $p = P_s/P_i$ and $x =$ gap spacing. Eleven data points provide adequate data to reduce interpolation errors to an acceptable level when such a least squares procedure is used to provide an equation for interpolation between the calibration data points. The program also stores the minimum value of $P_s/P_i$ (generally about 1) and the maximum of $P_s/P_i$ (generally about 4) for the calibration. (506).

Upon completion of the curve-fitting program, the calibration program divides the interval between the minimum value of $P_s/P_i$ and the maximum value of $P_s/P_i$ into 2500 equal intervals and, for the value of $P_s/P_i$ at each of the intervals, calculates from the equation resulting from the curve fitting, the corresponding values of x gap spacing). The minimum and maximum values of $P_s/P_i$, the value of the interval, and the values of x for each interval are then stored in a file designated as, for example, "DATA.DAT". The GAP program and associated DATA.DAT file complete the calibration program, and the GAP program and DATA.DAT program file are stored in a maintained data-processing system memory for use in a operating program (507). Upon completion of the calibration program, the menu prompts the operator that calibration is complete and advises the operator to push "ENTER" if he wishes to enter an operating program (508).

As shown in FIG. 14B, when the operator pushes "ENTER" to begin an operating program, data-processing system 421 loads the GAP program and reads the DATA.DAT file of a system (510). The GAP program calls for an assembly language procedure to collect data from the attached transducers, to average a designated number of readings from each of the transducers, and to calculate the dimensionless parameters $P_s/P_i$ from the averaged data. The GAP program then reads from the DATA.DAT file the minimum value of the $P_s/P_i$ stored therein, calculates from the actual measured value of $P_s/P_i$ the interval N at which the corresponding value of gap spacing is stored, and reads out the corresponding value of gap spacing stored at the interval N. (512).

Figure 15:
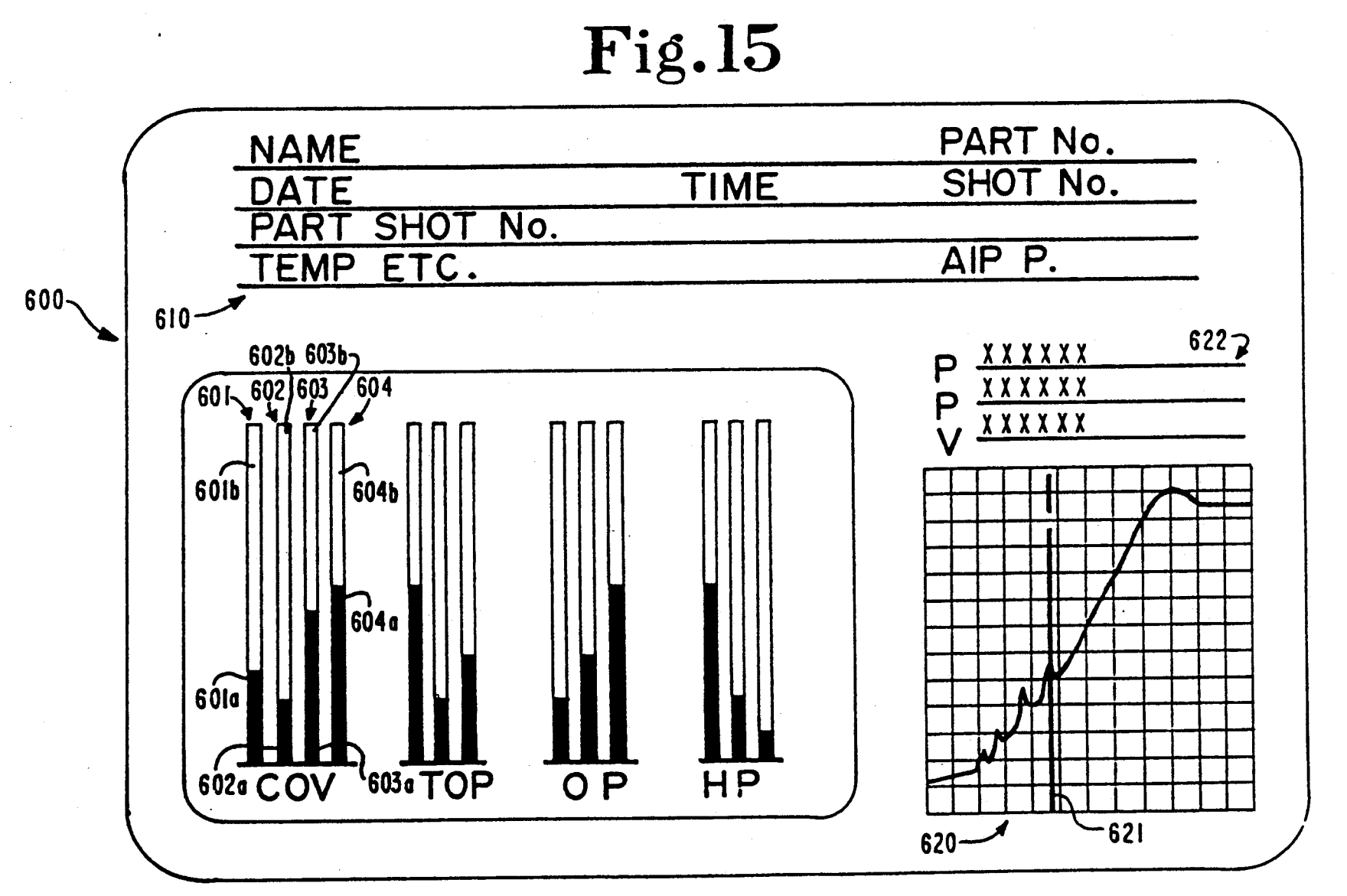

The GAP program includes instructions for generating and updating a display useful to the operator in analyzing the operation of the mold being monitored by the system of this invention (513). An example of such a display is shown in FIG. 15. As shown in FIG. 15, the display also can include a series of bar representations of the outputs of the plurality of orifice-forming sensors monitoring, for example, four movable mold elements of the die-casting operation. As shown in FIG. 15, the mold elements being monitored by a system can include a Cover, a Top Slide, an Operator, and a Helper; and as shown in FIG. 15, each of the mold elements is monitored by a plurality of orifice-forming sensors. Each of the vertical representations of the output of the orifice-forming sensors can include a bar chart presentation of the displacement of the sensor from its intended position. For example, as shown in FIG. 15, a bar chart presentation 600 can include lines 601–604 including portions 601a–604a whose lengths indicate the measurement of four sensors located in the mold's Cover from their intended positions, and can provide above the measurement portions 601a–604a, portions providing an indication 602b in one color, such as green, if the displacement is within acceptable limits, an indication 604b in another color, such as red, if the displacement of the sensor is outside the acceptable limits and, if desired, indications 601b–603b in a third color, such as blue, if the displacement is within a "gray zone". The operator display can also indicate, for example, at 610 the name of the part being produced, the part number, date, time, shot number, die temperature, metal temperature, injection pressure, and other such information. Furthermore, as shown in FIG. 15, the display of this system can include one or more selected graphs 620, like that shown in FIG. 5, showing, for example, the relative pressures applied to the charge, the velocity of the charge, the position of the charge piston during the die-filling portion of the die-casting cycle, etc. Where such a display is desired, digitally coded information from transducers added to or on the molding machine must be provided to computer 421 through connections such as 427. With such a system, the equipment Operator can position a "cursor" 621 provided by the program on the graph and read out appropriate data 622 in numeric form.

As shown on FIGS. 14A and 14B, the GAP program determines from die-casting machine controller 116, for example, at 428, when the die-casting process begins. The GAP program operates computer 421 to obtain and store predetermined data points before and after the die is locked up. For example, it has been found satisfactory to collect data points for every one/tenth of a second beginning with the closure of the die and continuing until the die-casting operation is complete. The collected data is stored and can be "printed out" for each orifice-forming sensor for the entire period of the "shot" on printer 425.

The step-to-step programming of the calibration program and the operating program, using information and description of the invention presented in this application above, are believed to be within the ordinary skill of the computer programmer and are, therefore, not set forth in such language as part of this application.

Although preferred embodiments have been described above, it should be recognized that the invention may take other specific forms. Because the invention can take other forms, the invention is limited only insofar as is required by the scope of the following claims.

We claim:

1. A method of monitoring operation of a mold having a plurality of mold elements, with at least one mold element being moved relative to another mold element by a molding machine, comprising:

identifying a plurality of mold elements to be monitored;

locating one or more orifice-forming means on one or more selected surfaces of the plurality of identified mold elements to be monitored; directing flows of air from the one or more selected surfaces of the identified mold elements to be monitored in such a manner that each of the air flows form each of the air orifice-forming means is affected by the relative movement of the one or more selected surfaces of the identified mold elements with respect to one or more adjacent mold elements during operation of the mold;

connecting each of the one or more orifice-forming means of the one or more selected surfaces via a passageway and a second upstream orifice with a regulated supply of air under pressure;

monitoring the air pressures of each of the passageways between each of the air orifice-forming means and each of the second upstream orifices; and determining from said monitored air pressures an output measurement of the spacing of the one or more selected surfaces of the identified mold elements form one or more adjacent mold elements during operation of the mold.

2. The method of claim 1 wherein said determining step includes the steps of developing electrical signals from the monitored air pressures indicative of the monitored air pressures, connecting said electrical signals indicative of the monitored air pressures to a microprocessor, and calculating from said electrical signals said output measurement of the spacing of the one or more selected surfaces of the identified mold elements from one or more adjacent mold elements during the operation of the mold.

3. The method of claim 1 further comprising the step of displaying the output measurement of the spacing of the one or more selected surfaces of the identified mold elements form one or more adjacent mold elements.

4. The method of claim 1 wherein said determining step further comprises:

measuring the pressure Ps of the supply of air and the pressure Pi of air in the passageway and calculating a dimensional pressure ratio from Ps and Pi;

calculating for several known distances in an expected range of distances including expected positions of the selected surfaces an associated series of dimensionless pressure ratios of Ps and Pi; p1 determining a relationship permitting accurate interpolation of distance throughout the expected range of distances from the dimensionless ratio of Ps and Pi;

preparing from said relationship a table including data corresponding to the dimensionless pressure ratio of Ps and Pi for a multiplicity of equally spaced distances throughout the expected range of distances including the intended surface positions; and determining Ps, Pi and the calculated dimensionless pressure ratios of Ps and Pi for each of the passageways and determining from said table the distance of each of said selected surfaces of each of the plurality of identified mold elements from one or more adjacent mold elements.

5. The method of claim 4 further comprising the step of substantially simultaneously displaying the distances of each of said selected surfaces from one or more adjacent mold elements.

6. A method of monitoring the operation of a mold having an open position and a closed position, comprising:

locating one or more orifice-forming means in one or more selected surfaces of one or more mold elements, said mold having one or more mold elements that move in operation of the mold so that said one or more selected surfaces are in an intended closed position against another mold element, each of the one or more orifice-forming means being so located that air flow from the one or more orifice-forming means is reduced as the one or more selected surfaces approach its or their intended closed positions during operation of the mold;

connecting the one or more orifice-forming means via one or more passageways and upstream restrictions with a supply of air under pressure to create a flow of air through the one or more passageways, restrictions, and orifice-forming means;

monitoring the pressure Ps of the supply of air and the pressures Pi of the one or more passageways, converting the monitored pressures Ps and Pi to digital values, and calculating dimensionless pressure ratios from the monitored pressures Ps and Pi;

preparing a table including data corresponding to the dimensionless pressure ratios calculated from Ps and from the pressures Pi of the one or more passageways for the one or more selected surfaces of the mold elements from their closed to their open positions, and data corresponding to gap spacings for the dimensionless pressure ratios from the closed to the open positions of the one or more selected surfaces;

determining during mold operation Ps, Pi and calculated dimensionless pressure ratios for the one or more upstream restrictions, passageways, and orifice-forming means; and determining from said table, the spacing of each of the one or more surfaces from its intended closed position during operation of the mold.

7. The method of claim 6 wherein the step of preparing a table of dimensionless pressure coefficients and gap spacings includes the steps of measuring Ps and Pi at a plurality of known gap spacings, calculating the dimensionless pressure ratios Ps/Pi for each of the known gap spacings, developing an equation of gap spacing as a function of the dimensionless pressure ratio Ps/Pi, and calculating from said equation a table of gap spacings for many dimensionless pressure ratios Ps/Pi obtained form the closed to open positions of the one or more mold elements.

8. The method of claim 6 further comprising the step of displaying the spacing of each of the one or more surfaces from its intended closed position.

* * * * *